US 7,751,357 B2

(12) United States Patent
Muqattash et al.

(10) Patent No.: US 7,751,357 B2
(45) Date of Patent: *Jul. 6, 2010

(54) POWER MANAGEMENT

(75) Inventors: Alaa Muqattash, San Diego, CA (US); Ghoabad Heidari-Bateni, San Deigo, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 530 days.

This patent is subject to a terminal disclaimer.

(21) Appl. No.: 11/671,955

(22) Filed: Feb. 6, 2007

(65) Prior Publication Data

US 2007/0197186 A1      Aug. 23, 2007

Related U.S. Application Data

(60) Provisional application No. 60/765,980, filed on Feb. 6, 2006, provisional application No. 60/775,518, filed on Feb. 21, 2006, provisional application No. 60/825,110, filed on Sep. 8, 2006, provisional application No. 60/828,743, filed on Oct. 9, 2006.

(51) Int. Cl.
  *G08C 17/00*   (2006.01)
(52) U.S. Cl. ............ 370/311; 455/574; 455/343.1; 455/41.2; 455/69; 370/321; 370/324; 370/350
(58) Field of Classification Search ............ 455/574, 455/502, 343.4, 343.1, 343.2, 343.3, 69, 455/41.2; 370/311, 124, 312, 432, 350, 503, 370/510–514, 321, 324, 336, 337, 338
See application file for complete search history.

(56) References Cited

U.S. PATENT DOCUMENTS 5,509,015 A * 4/1996 Tiedemann et al. ......... 370/311
5,560,021 A   9/1996 Vook et al.

(Continued)

FOREIGN PATENT DOCUMENTS

EP      0522631 A2     1/1993

(Continued)

OTHER PUBLICATIONS

Muqattash et al., Office Action, U.S. Appl. No. 11/671,973, Date: Jul. 7, 2009.

(Continued)

*Primary Examiner*—Kent Chang
*Assistant Examiner*—Magdi Elhag
(74) *Attorney, Agent, or Firm*—Sheppard Mullin Richter & Hampton LLP

(57) ABSTRACT

According to an embodiment of the invention the timing of one or more local communication windows can be defined using equations such that one or more local communication windows for two or more devices overlap. For example the periods between two consecutive local communication windows can be defined using a periodic equation such as: LAP Cycle Period=$\Delta*2^n$. In this equation n=0, 1, 2, ..., N, where N and $\Delta$ can be fixed. For example, N and $\Delta$ can be numbers that are predetermined for a given network, a given set of network devices, etc. In one embodiment every device can become active every $\Delta*2^n$ superframes. The frequency (n) can be determined based on, for example, incoming or outgoing message traffic, power consumption needs, etc.

24 Claims, 15 Drawing Sheets

U.S. PATENT DOCUMENTS

| | | | |
|---|---|---|---|
| 6,192,230 B1 * | 2/2001 | van Bokhorst et al. | 455/343.3 |
| 6,963,747 B1 | 11/2005 | Elliott | |
| 7,277,737 B1 * | 10/2007 | Vollmer et al. | 455/574 |
| 7,428,229 B2 * | 9/2008 | Bonta et al. | 370/338 |
| 7,564,826 B2 | 7/2009 | Sherman | |
| 7,567,815 B2 | 7/2009 | Nishikawa | |
| 2002/0019215 A1 * | 2/2002 | Romans | 455/69 |
| 2003/0002482 A1 | 1/2003 | Kubler et al. | |
| 2003/0199272 A1 | 10/2003 | Shvodian et al. | |
| 2004/0190467 A1 | 9/2004 | Liu et al. | |
| 2004/0253996 A1 | 12/2004 | Chen et al. | |
| 2005/0117530 A1 | 6/2005 | Santosh | |
| 2005/0135302 A1 | 6/2005 | Wang et al. | |
| 2005/0195772 A1 | 9/2005 | Nishikawa | |
| 2005/0227615 A1 | 10/2005 | Sakoda | |
| 2005/0275587 A1 | 12/2005 | Siegel et al. | |
| 2006/0002357 A1 | 1/2006 | Sherman | |
| 2006/0128351 A1 | 6/2006 | Hassan et al. | |
| 2007/0014269 A1 | 1/2007 | Sherman | |
| 2007/0041353 A1 | 2/2007 | Li et al. | |
| 2007/0053315 A1 | 3/2007 | Sugaya | |
| 2007/0054680 A1 * | 3/2007 | Mo et al. | 455/502 |
| 2008/0232286 A1 * | 9/2008 | Habetha et al. | 370/311 |
| 2009/0010245 A1 * | 1/2009 | Worfolk et al. | 370/350 |

FOREIGN PATENT DOCUMENTS

| | | |
|---|---|---|
| EP | 0529269 A2 | 3/1993 |
| EP | 1033832 A2 | 9/2000 |
| EP | 1519599 A2 | 3/2005 |
| EP | 1592272 A2 | 11/2005 |
| EP | 1608192 A1 | 12/2005 |
| GB | 2415573 A | 12/2005 |
| WO | WO 2005076545 A1 | 8/2005 |

OTHER PUBLICATIONS

Muqattash et al., Office Action, U.S. Appl. No. 11/671,973, Date: Mar. 1, 2010.

Muqattash et al., Office Action, U.S. Appl. No. 11/615,304, Date: Aug. 7, 2019.

Muqattash et al., Office Action, U.S. Appl. No. 11/671,966, Date: Sep. 3, 2010.

* cited by examiner

POWER MANAGEMENT

CROSS-REFERENCE TO RELATED APPLICATIONS

This application claims priority from the following U.S. Provisional Patent Applications with the following Ser. Nos. 60/765,980 filed Feb. 6, 2006; 60/775,518 filed Feb. 21, 2006; 60/825,110 filed Sep. 8, 2006; and 60/828,743 filed Oct. 9, 2006; each of which are hereby incorporated herein by reference in the respective entirety of each.

TECHNICAL FIELD

The present invention relates to communications, and more particularly, some embodiments relate to power save modes in a communication system.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

With the proliferation of portable and low-power consumption devices, techniques for extending battery life or otherwise reducing power consumption have been developed. Consequently, an important goal in the design of wireless networks is to enable long operation time for battery powered devices. An effective method to extend battery life is to enable devices to turn off completely (i.e., hibernate) for long periods of time, where a long period is relative to the superframe duration.

For example, one way to utilize the hibernation power saving mechanism as outlined by the WiMedia MAC protocol is to provide two power management modes in which a device can operate: the active mode and the hibernation mode. Devices in the active mode transmit and receive beacons in every superframe. Devices in the hibernation mode hibernate for multiple superframes and do not transmit or receive in those superframes, thus saving energy. These periods are typically fixed periodic active and hibernation periods.

BRIEF SUMMARY OF EMBODIMENTS OF THE INVENTION

According to various embodiments of the invention a device can announce broadcast traffic in the global access period. Thus, a destination can change its local access period every global access period. By announcing a local access period during a global access period it can be more likely that a source device in a network will receive the information because all devices should be active during the global access period. By checking during a receiver device's known local access period a source device can reduce the amount of time that it spends in the idle state waiting for its destination to become active because, for example, the source can wake from hibernation at the same time that the destination awakens from hibernation. A device can awaken for its local access period and during the local access period a source device can schedule a transmission and transmit information to the device.

According to another embodiment of the invention the timing of one or more local access periods can be defined using equations such that one or more local access periods for two or more devices overlap. For example the periods between two consecutive local access periods can be defined using a periodic equation such as: LAP Cycle Period=$\Delta*2^n$. In this equation n=0, 1, 2, . . . , N, where N and $\Delta$ can be fixed. For example, N and $\Delta$ can be numbers that are predetermined for a given network, a given set of network devices, etc. In one embodiment every device can become active every $\Delta*2^n$ superframes. The frequency (n) can be determined based on, for example, incoming or outgoing message traffic, power consumption needs, etc.

According to another embodiment of the invention, a system and method to provide alignment of hibernation and active cycles is provided. When one device receives a beacon from one of its neighbors it can be implemented to check for the neighboring device's global cycle start countdown value and to compare it's global cycle start countdown value with its own. If the beacon from the neighboring device contains a value that is different from the device's own global cycle start countdown, the device can be implemented to check a predefined condition.

For example, if a device's global cycle start time falls into the first half of a neighbor's global cycle, then the device changes its own global cycle start time to the global cycle start time of that neighbor. Otherwise, the device does nothing. Note, however, that in one embodiment both devices can be configured to check this condition from their own perspectives. In one embodiment the condition used is checked by both devices D1 and D2 but the condition is designed such that it will become true for one or the other of the two devices, to help ensure that there won't be any instability in the this protocol, for almost all cases. In one embodiment a "tie-breaker" can be included for cases where both devices will be led to the same conclusion.

According to another embodiment of the invention, a system and method to provide alignment of hibernation and active cycles is provided for multiple (e.g., more than 2) devices that are in range of each other. For example, if a device's global cycle start time falls into the first 256/K superframes of a neighbor's global cycle, then the device changes its own global cycle start time to the global cycle start time of that neighbor. Otherwise, the device does nothing. In one embodiment, K can be the number of different global active cycle start times observed by the device. In one embodiment a "tie-breaker" can be included for cases where two or more devices will be led to the same conclusion.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
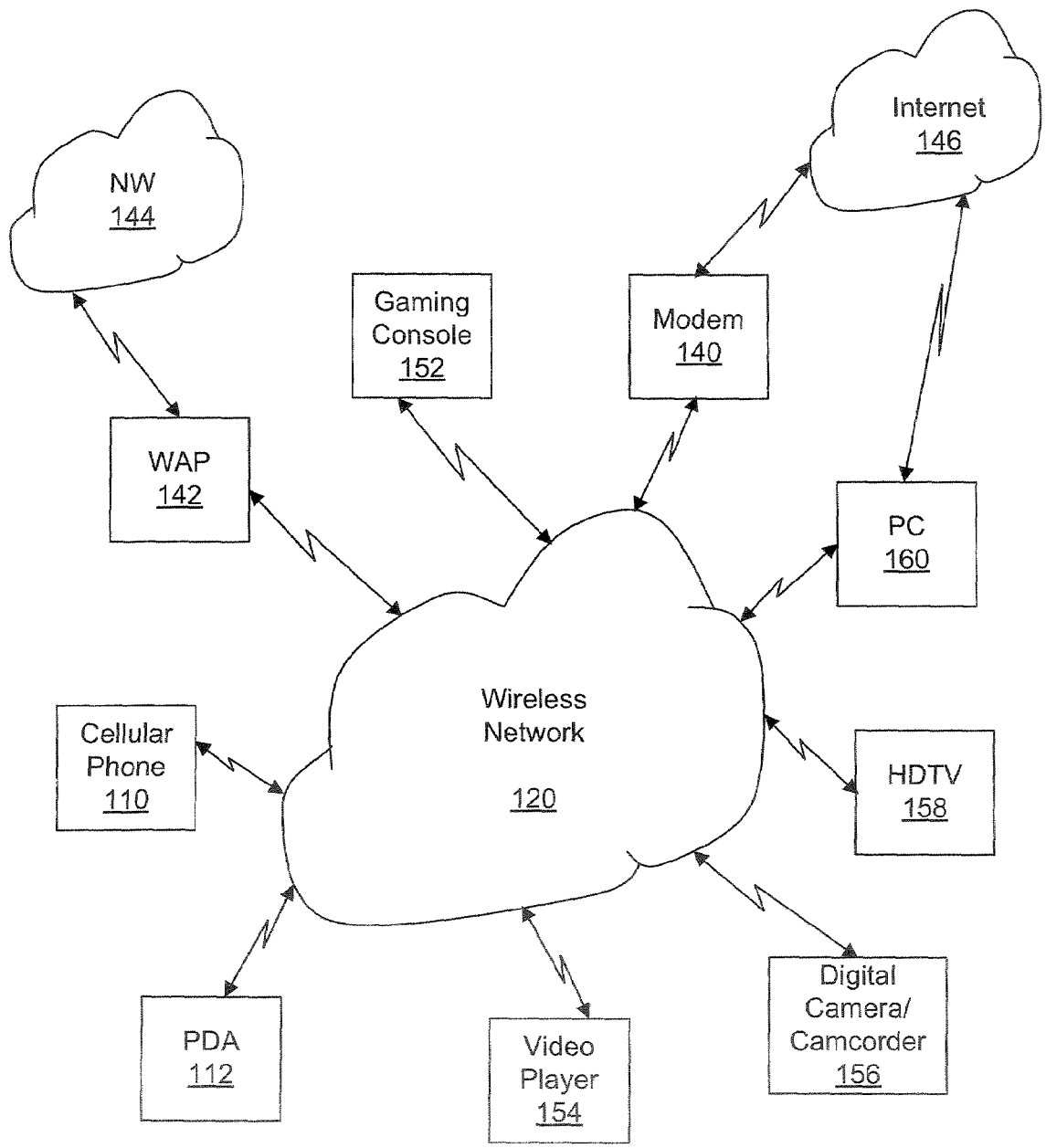
FIG. 1 is a block diagram illustrating one possible configuration of a wireless network that can serve as an example environment in which the present invention can be implemented.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks and other channels, both wired and wireless, are now commonplace in many home and office environments. Such networks allow various heretofore independent devices to share data and other information to enhance productivity or simply to improve their convenience to the user. One such communication network that is gaining widespread popularity is an exemplary implementation of a wireless network such as that specified by the WiMedia-MBOA (Multiband OFDM Alliance). Other exemplary networks include the Bluetooth® communications network and various IEEE standards-based networks such as 802.11 and 802.16 communications networks, to name a few.

With the proliferation of portable and low-power consumption devices, techniques for extending battery life, otherwise reducing power consumption, or managing power usage have been developed. Consequently, one goal in the design of wireless networks can be to enable long operation time for battery powered devices. An effective method to extend battery life is to enable devices to turn off some or all of their functions (i.e., hibernate) for relatively long periods of time. For example, a long period might be long relative to a superframe duration.

In one embodiment, the present invention provides systems and methods for power management in electronic devices. A power saving mechanism can enable battery-powered and other power-conscious devices, such as WiNet devices for example, to utilize hibernation modes for power conservation. In another embodiment, hibernation modes offered by the WiMedia MAC protocol are utilized for the power management, allowing devices to dynamically change the durations of hibernation and active modes via WiNet negotiation. As would be apparent to one of ordinary skill in the art after reading this description this mechanism can be implemented in alternative environments.

For example, one way to utilize the hibernation power saving mechanism as outlined by the WiMedia MAC protocol is to provide two power management modes in which a device can operate: the active mode and the hibernation mode. In this environment, devices in the active mode transmit and receive beacons in every superframe; while devices in the hibernation mode hibernate for multiple superframes and do not transmit or receive in those superframes, thus saving energy. These periods might typically be fixed periodic active and hibernation periods.

Various networks and other communication protocols allow their devices to go into hibernation and active modes. In one embodiment, the invention enables the devices to synchronize their active cycles to enable devices to have their awake times better aligned temporally. As such, in one embodiment, they can awaken, conduct their respective activities, and return to hibernation mode without have to wait an inordinate amount of time for the other devices with which they are communicating to awaken.

For example, in one environment, the WiMedia WiNet specification defines a mechanism that enables devices to periodically go into active mode and dynamically adjust their hibernation duty cycles. In order to synchronize with neighbors' local cycles, a device might typically maintain a global cycle start time for its neighbors. One embodiment of the invention allows a system and method for enabling devices to align their global cycle start times.

Before describing the invention in detail, it is useful to describe an example environment in which the invention can be implemented. One such example is a wireless beaconing network in which multiple electronic devices (for example, computers and computing devices, cellular telephones, personal digital assistants, motion and still cameras, among others) can communicate and share data, content and other information with one another. One example of such a network is that specified by the WiMedia standard (within WiMedia and Multi-Band OFDM Alliance). From time-to-time, the present invention is described herein in terms of a distributed network or in terms of a WiMedia standard. Description in terms of these environments is provided to allow the various features and embodiments of the invention to be portrayed in the context of an exemplary application. After reading this description, it will become apparent to one of ordinary skill in the art how the invention can be implemented in different and alternative environments. Indeed, applicability of the invention is not limited to a distributed wireless network, nor is it limited to a WiMedia standard described as one implementation of the example environment.

Most network standards specify policies or rules that govern the behavior of network connected devices. The WiMedia standard specifies the mechanism and policies that are to be followed by W-USB and WiNet compliant devices in order to allow for an ad hoc and distributed network of such devices to operate efficiently.

In most distributed networks, the network of the devices is maintained by requiring all devices to announce parameters such as their presence, their capabilities and their intentions for reserving transmission slots and so on. For example, with the WiMedia standard, this can be done during what are referred to as beacon period time slots. According to this standard, devices joining the network are expected to monitor the beacon period to learn about the network status and parameters before attempting to use the network. In other network configurations, beacon periods are similarly used to allow management of network devices as described more fully below. Thus, beacon periods are one form of window or network period during which scheduling or other housekeeping activities can be conducted. Beacon periods in the above-referenced standard, and other time periods used for scheduling or other housekeeping chores in other network configurations, are generally referred to as scheduling windows.

Devices are typically allowed to enter a power save mode to conserve power and possibly prolong operation. For example, battery operated devices may enter a sleep mode or even a deep-sleep mode, wherein one or more of their functions are diminished or shut down in order to conserve power. Depending on the environment, devices may be allowed to enter into a sleep mode for short or long periods of time. For example, a sleep mode can be an energy-saving mode of operation in which some or all components are shut down or their operation limited. Many battery-operated devices, such as notebook computers, cell phones, and other portable electronic devices support one or more levels of a sleep mode. For example, when a notebook computer goes into one level of sleep mode, it may turn off the hard drive and still allow the user to perform operations, only powering up the hard drive when access is needed. In a deeper level of sleep, the computer may further turn off the display. In yet a further level of sleep, the computer may enter a hibernate state. Likewise, other electronic devices communicating across a communication channel may have similar sleep states and may power down unnecessary or unused components, including an RF transceiver, depending on a number of factors such as elapsed time, activities and so on. As described below, in accordance with one embodiment, devices may be prompted to enter a sleep mode upon completion of scheduling or other housekeeping activities and be configured to awaken for scheduled activities such as, for example, communication activities.

In one embodiment sleep mode can be, for example, an energy-saving mode of operation for a portion of a superframe in which some or all components are shut down or their operation limited but during which beacons are sent. (Some or all of the components can power up when a beacon is to be sent.) In another embodiment hibernate can be, for example, an energy-saving mode of operation for multiple superframes in which some or all components are shut down or their operation limited and during which beacons are not sent.

FIG. 1 is a block diagram illustrating one possible configuration of a wireless network that can serve as an example environment in which the present invention can be implemented. Referring now to FIG. 1, a wireless network 120 is provided to allow a plurality of electronic devices to communicate with one another without the need for wires or cables between the devices. A wireless network 120 can vary in coverage area depending on a number of factors or parameters including, for example, the transmit power levels and receive sensitivities of the various electronic devices associated with the network. Examples of wireless networks can include the various IEEE and other standards as described above, as well as other wireless network implementations.

With many applications, the wireless network 120 operates in a relatively confined area, such as, for example, a home or an office. The example illustrated in FIG. 1 is an example of an implementation such as that which may be found in a home or small office environment. Of course wireless communication networks and communication networks in general are found in many environments outside the home and office as well. In the example illustrated in FIG. 1, wireless network 120 includes a communication device to allow it to communicate with external networks. More particularly, in the illustrated example, wireless network 120 includes a modem 140 to provide connectivity to an external network such as the Internet 146, and a wireless access point 142 that can provide external connectivity to another network 144.

Also illustrated in the example wireless network 120 are portable electronic devices such as a cellular telephone 110 and a personal digital assistant ("PDA") 112. Like the other electronic devices illustrated in FIG. 1, cellular telephone 110 and PDA 112 can communicate with wireless network 120 via the appropriate wireless interface. Additionally, these devices may be configured to further communicate with an external network. For example, cellular telephone 110 is typically configured to communicate with a wide area wireless network by way of a base station.

Additionally, the example environment illustrated in FIG. 1 also includes examples of home entertainment devices connected to wireless network 120. In the illustrated example, electronic devices such as a gaming console 152, a video player 154, a digital camera/camcorder 156, and a high definition television 158 are illustrated as being interconnected via wireless network 120. For example, a digital camera or camcorder 156 can be utilized by a user to capture one or more still picture or motion video images. The captured images can be stored in a local memory or storage device associated with digital camera or camcorder 156 and ultimately communicated to another electronic device via wireless network 120. For example, the user may wish to provide a digital video stream to a high definition television set 158 associated with wireless network 120. As another example, the user may wish to upload one or more images from digital camera 156 to his or her personal computer 160 or to the Internet 146. This can be accomplished by wireless network 120. Of course, wireless network 120 can be utilized to provide data, content, and other information sharing on a peer-to-peer or other basis, as the provided examples serve to illustrate.

Also illustrated is a personal computer 160 or other computing device connected to wireless network 120 via a wireless air interface. As depicted in the illustrated example, personal computer 160 can also provide connectivity to an external network such as the Internet 146.

In the illustrated example, wireless network 120 is implemented so as to provide wireless connectivity to the various electronic devices associated therewith. Wireless network 120 allows these devices to share data, content, and other information with one another across wireless network 120. Typically, in such an environment, the electronic devices would have the appropriate transmitter, receiver, or transceiver to allow communication via the air interface with other devices associated with wireless network 120. These electronic devices may conform to one or more appropriate wireless standards and, in fact, multiple standards may be in play within a given neighborhood. Electronic devices associated with the network typically also have control logic configured to manage communications across the network and to manage the operational functionality of the electronic device. Such control logic can be implemented using hardware, software, or a combination thereof. For example, one or more processors, ASICs, PLAs, and other logic devices or components can be included with the device to implement the desired features and functionality. Additionally, memory or other data and information storage capacity can be included to facilitate operation of the device and communication across the network.

Electronic devices operating as a part of wireless network 120 are sometimes referred to herein as network devices, members or member devices of the network or devices associated with the network. In one embodiment devices that communicate with a given network may be members or merely in communication with the network.

Some communication networks are divided into periods or frames that can be used for communication and other activities. For example, as discussed above, some networks have a scheduling window such as, for example, a beacon period, for scheduling upcoming communication activities. Also, some networks have a communication window during which such communication activities take place. In the WiMedia-MBOA standard, the bandwidth is divided into superframes, which in turn are divided into time slots for the transmission and reception of data by the various electronic devices associated with the network.

Figure 2:
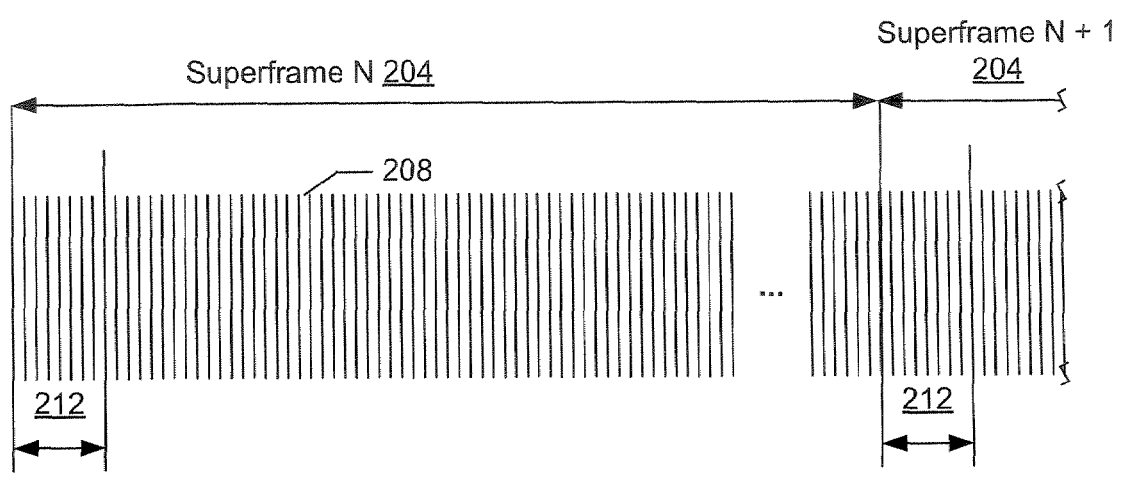
FIG. 2 is a diagram illustrating bandwidth that can be divided into superframes, which in turn can be divided into time slots.

An example of such time slots are illustrated in FIG. 2. Referring now to FIG. 2, in this exemplary environment, the communication bandwidth is divided into superframes 204 (two illustrated), each superframe 204 itself being divided into a plurality of timeslots referred to as Media Access Slots 208. In the example environment, there are 256 media access slots 208 in each superframe 204, although other allocations are possible. Additionally, at the beginning of each superframe 204 is a beacon period 212, which is comprised of a plurality of beaconing slots. In some networks, the beacon period 212 is a period during which devices reserve timeslots and exchange other housekeeping or status information. For example, in the WiMedia-MBOA distributed wireless network, the superframes comprise a beacon period 212, during which devices are awake and receive beacons from other devices. Superframes in the above-referenced standard, and other time periods used for communications among devices in other network configurations, with or without scheduling windows, are generally referred to herein as communication windows. As noted above, for clarity of description the present invention is described in terms of the example environment, and thus is at times described using the terms superframe and beacon period. As would be apparent to one of ordinary skill in the art after reading this description, the invention applies to other communication formats, including the more general case utilizing scheduling windows and communication windows. Additionally, the invention is not limited to applications where the bandwidth is divided into frames or windows, but can be generally applied to communication channels and networks of various protocols and configurations.

Having thus described an example environment in which the invention can be implemented, various features and embodiments of the invention are now described in further detail. Description may be provided in terms of this example environment for ease of discussion and understanding only. After reading the description herein, it will become apparent to one of ordinary skill in the art that the present invention can be implemented in any of a number of different communication environments (including wired or wireless communication environments, and distributed or non-distributed networks) operating with any of a number of different electronic devices and according to various similar or alternative protocols or specifications.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments, and how the invention can be implemented for non-hazardous as well as hazardous materials.

One embodiment of the invention provides a mechanism that enables battery-powered or other power sensitive communication devices to utilize the hibernation power saving mechanism offered by existing protocols such as, for example, the WiMedia MAC protocol. In this example implementation, the invention can be implemented to provide a new dimension of traffic indication (for example, at the WiNET sub-layer), by enabling devices to go into hibernation mode unless they have traffic to transmit or they are "woken up" by their neighbors. This can allow devices to dynamically change the durations of hibernation and active modes via WiNET negotiation.

For energy efficiency, any or all of the following features can be implemented in accordance with various embodiments of the invention. In accordance with one feature, in circumstances where there is no data buffered for transmission for a network device, that device is permitted to hibernate preferably for as long as possible or practical and is thus preferably active for as short a time period as possible or practical.

In accordance with another feature that might be implemented, where there is data buffered for transmission for a network device, that receiving device can be permitted to remain active for as long as needed to receive the data. Preferably, that receiving device remains active only as long as needed to receive the data.

In accordance with yet another feature that might be implemented, to help prevent the target from hibernating for too long, a mechanism can be provided for the traffic source to provide information to the target regarding the next time that the source may have traffic for that target. This expected time can, for example, be based on traffic statistical models, known requirements or other methods used at the source device.

Inherently, in many situations, fixed duty cycles might not perform well in all situations. Because the active and hibernation periods affect throughput and energy consumption, fixed duty cycles for these periods may not always provide optimum performance. If the active period is chosen to be too small, there may not be enough time available to send or receive traffic, potentially degrading throughput. If the active period is too long, the device has less time to hibernate, potentially increasing the energy consumption. Also, if the hibernation period is too long, then the source device may need to wait a long period of time before the target is active, potentially causing throughput degradation and buffer overflows. Thus, fixed periods might not always lead to optimal power conservation.

In the example environment, the Traffic Indication Map ("TIM") Information Element ("IE") provides a mechanism to indicate that an active device has data buffered for transmission via Prioritized Contention Access ("PCA") for one or more of its neighbors. This mechanism allows a device that is not expecting traffic during a certain superframe to go into a power save mode, such as a sleep state, thus saving the device's energy. Because TIM IE is used to indicate traffic within the superframe, it can be considered as an intra-superframe traffic indication mechanism.

In accordance with one embodiment of the invention, a new dimension of traffic indication can be provided. In terms of the example environment, for instance, at the WiNET sub-layer level an inter-superframe traffic indication mechanism can be provided. This mechanism in one embodiment is orthogonal to the TIM IE mechanism, and can improve devices' energy savings. In one implementation, a network device is permitted or instructed to go into the hibernation mode whenever it does not have traffic to transmit. The device, however, can be configured so as to not remain in hibernation mode for longer than a given period so that it can receive traffic information from other network devices that may wish to communicate with it. Upon receiving this traffic information, the network device will be able to determine whether to remain awake or when to next reawaken to receive the intended data.

In terms of the example environment, in one embodiment the device can remain asleep for a variable period of X superframes, and awaken in order to receive traffic information from other network devices that may wish to communicate with it (for example, "WiNET traffic indications" from its WiNET neighboring devices in the example environment). The indication, which can be referred to as a WiNET Traffic Indication ("WTI") (although other designations are possible), can, in one embodiment, be encoded in the source's beacon. For example the indication can be encoded in the WiNET Application Specific Information Element ("ASIE"). Similar to the TIM IE, it can be implemented to contain the DevAddr or other identification of every neighboring device for which WiNET traffic is buffered. Additionally, the traffic indication (for example, the WTI) can be used to indicate a recommended hibernation period for each one of those neighbors.

In one embodiment, a first network device that wishes to communicate with one of its hibernating neighbors can wait until that neighbor goes into an active mode. In one embodiment, the maximum time period before a device goes into an active mode can be designated as a predetermined maximum latency of X superframes. When the neighbor goes into the active mode, that neighbor's identification (for example, its DevAddr or other identifier) and the recommend hibernation period can be included in the first device's traffic indication. Note that in the example environment the MAC specification mandates that the hibernating devices advertise the hibernation period (i.e., X), so the source device may know when the target will be active.

A device that receives a traffic indication that contains its identification (e.g., DevAddr) can be configured to remain in the active mode for as long as traffic indications included in received beacons contain its identification. The traffic indicator thus acts as a "wake up" message for a network device. This allows the device to remain asleep as long as it does not need to transmit information, and to awaken only periodically to check for traffic indications affecting it. Thus, the invention can be implemented in one embodiment so that the default behavior is hibernation unless wake up calls are received. This can increase the hibernation period, thus potentially improving network devices' energy consumption.

In one embodiment as mentioned above, the sending device can include a recommended hibernation period. This recommended hibernation period can provide information to the target device regarding how long the device should hibernate before waking up again to receive traffic from the source device sending this recommendation. Various methodologies can be used to determine this parameter, and may be implementation specific. Preferably, the parameter takes into account the expected traffic patterns at the source device.

For example, in one embodiment, when a source device may have traffic for multiple target devices the source device can send a recommended hibernation period for each target device. Thus, for this example, assume that a source device S1 has traffic or plans to have traffic for target devices T1, T2, and T3. S1 can suggest that T2 and T3 both hibernate during the time period when it plans to transmit traffic to T1. Similarly, S1 can suggest that T1 and T3 both hibernate during the time period when it plans to transmit traffic to T2. Further, S1 can suggest that T1 and T2 both hibernate during the time period when it plans to transmit traffic to T3. T1, T2, and T3 may or may not hibernate, however. For example, if T1 has additional traffic from another source it might not hibernate while S1 is communicating with T2, T3, or both, depending on when it receives or expects to receive this additional traffic, how much additional traffic T1 has, etc.

Whether the target device follows this recommend hibernation period may depend on a number of factors such as its power capabilities, QoS ("Quality of Service") constraints, network requirements, other scheduled communications activities, etc. In one embodiment, whether it follows the recommendation or not, the invention can be implemented such that the source device will hear the hibernation period (part of MAC rules), and wait until the target is up again to send the data. The source can then keep the target active by including the target address in the traffic indicator so long as there is traffic for that target.

Thus, according to the various embodiments described above, one feature that can be provided is that in scenarios where no data is buffered for transmission to a network device, that device will not receive a traffic indicator that contains its identification, and is able to hibernate. Of course, if that device has other activities to perform or other requirements, it may awaken for other reasons. On the other hand, where there is data buffered for transmission to a target network device, or it is otherwise known that the target is designated to receive traffic, the target device receives a traffic indicator that contains its identification.

The target device can also receive a recommended hibernation period or other indication of when the communication is desired or scheduled. As such, the target device can transition to (or remain in) the active mode to receive this traffic at the proposed or desired time. Thus, a dynamic wake up period can be provided allowing the hibernation and wake up times to be tailored to ongoing or anticipated network activities for a given device.

Figure 3:
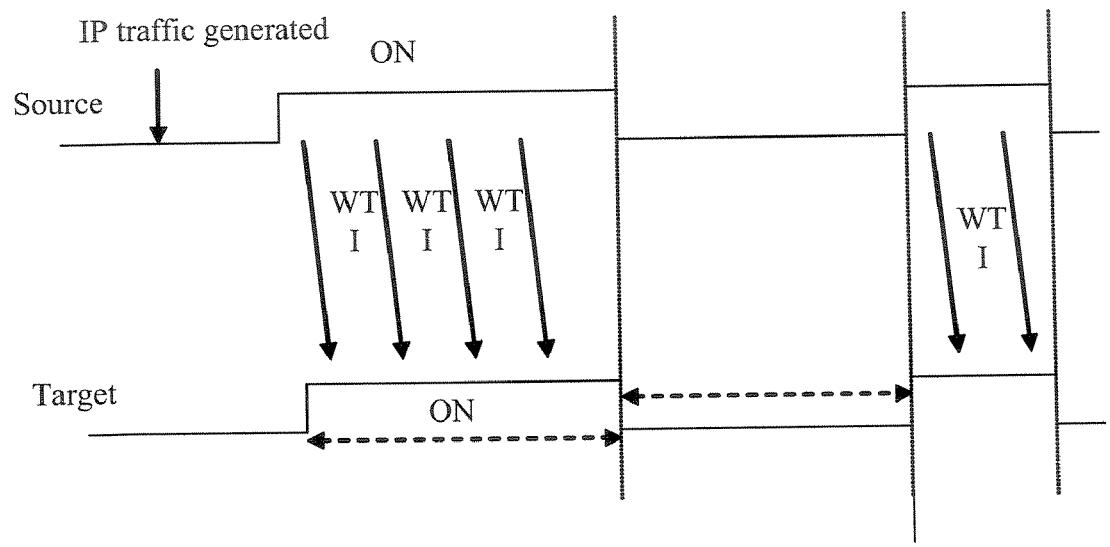
FIG. 3 is a diagram illustrating one example of the power saving mechanism in accordance with one embodiment of the invention.

FIG. 3 is a diagram illustrating one example of the proposed mechanism. For the purposes of this example, it can be assumed that some IP traffic is buffered for transmission at the WiNET source. If the source is aware of when the target will wake up (for example, via MAC rules or other protocol), the source might wait until the target is designated to be awake before sending the traffic indicator (for example, the WTI). Where the source has no other designated activities, the source can also remain in the hibernation mode, and wake up only right before the target wakes up (or otherwise be awake for some overlapping period.)

The source device goes into the active mode and transmits its traffic indicator identifying the target device. In one embodiment, the source device can wait until it detects the target beacon, indicating the target is active. Once the target is active, the source includes the target identification (e.g., the DevAddr) in its traffic indicator (e.g., WTI) encoded in the beacon. In one embodiment, the source device keeps including the target indicator in the beacon as long as there is data buffered for the target. When no more data is buffered at the source node for that target, the source device can recommend that the target hibernate.

Figure 4:
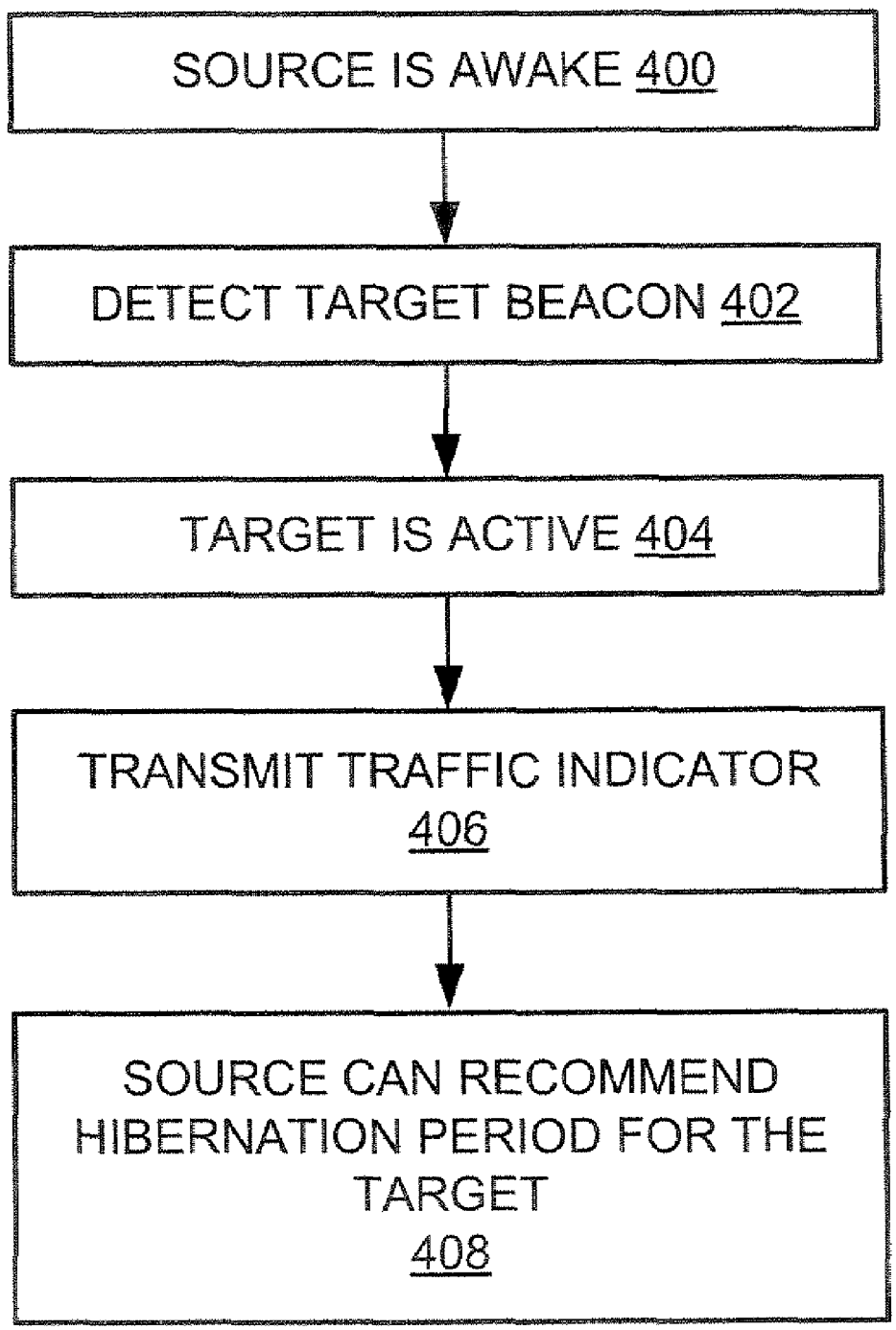
FIG. 4 is a flowchart illustrating one example method in accordance with the systems and methods described herein.

Referring now to FIG. 4 a flowchart further illustrating the example of FIG. 3 is discussed. In a step 400 a source is awake. The source can, for example, wake up right before it expects the target to wake up. Alternatively, the source can wake up at some time while the target is already awake. Additionally, the source may already be awake, for example, the source may have had traffic for other targets.

In one embodiment, the source device can wait until it detects the target beacon, step 402 indicating the target is active. Once the target is active, in a step 404 the source device can go into the active mode and transmits its traffic indicator identifying the target device in a step 406. In another embodiment the source device can go into the active mode and transmits its traffic indicator identifying the target device without waiting until it detects the target beacon. For example, the transmission can be based on timing alone, thus, the source device might, in some embodiments, know when the target is going to be active accurately enough so that it does not need to wait for the target's beacon. Thus, step 402 may or may not be required in some embodiments. As discussed above, the transmissions from the source can includes the target identification (e.g., the DevAddr) in its traffic indicator (e.g., WTI) encoded in the beacon. In one embodiment, the source device can keep including the target indicator in the beacon as long as there is data buffered for the target.

When no more data is buffered at the source node for that target, the source device can recommend that the target hibernate in a step 408. In one embodiment, the source device can recommend that the target hibernate for X communication windows (e.g., superframes 204). The target may take that recommendation as an indication of when the next burst of data from source may come in. Of course, the target may have received other recommendations from other sources it communicates with or may otherwise have network requirements. Therefore, the target might not follow the recommended hibernation duration, but can use it in determining the best hibernation duration to meet its own requirements or the expected traffic requirements of all its sources. Thus, depending on other activities, both the source and the target can now hibernate and wake up later to exchange data. Just before hibernation, both of them announce their hibernation period based on MAC rules. Thus, the Source will be able to determine the Target's planned hibernation period, regardless of the recommendations made.

Various systems and methods of power management are described herein. These systems and methods generally use various communication windows to transmit and receive various information to and from each other. Some of these communication windows can be individual or local communication windows. A local access period can, in one embodiment, be an individual or local communication window. The local access period generally references a time period or duration of time when an individual device wakes for the purpose of sending or receiving transmissions from other devices. In some cases other devices can be awake during some or all of the individual devices local access period, for example, when one or more of these other devices has traffic for the individual device.

A global communication window generally references a time period or duration of time when all devices, a plurality of devices, a referenced device, or a relevant set of devices is or should be in the active or wakeup mode to exchange information, for example, on a global level. A global access period is a global communication window.

According to various embodiments of the invention a device can announce broadcast traffic in a global access period. By announcing a local access period during a global access period it can be more likely that a source device in a network will receive the information because many, if not all of the devices in a neighborhood should be active during the global access period. A device can awaken for its local access period and during the local access period a source device can schedule a transmission and transmit information to the device. In this way, power can be managed by, in certain circumstances, allowing a source device to hibernate until a target device, also sometimes referred to as a receiver device or a recipient device wakes, rather than requiring the device to stay awake while waiting for the target device to wake up.

According to an embodiment, the timing of one or more local access periods can be defined using equations such that one or more local access periods for two or more devices overlap. For example the periods between two consecutive local access periods can be defined using a periodic equation. In this way power can be managed by, in one embodiments, allowing a source device to calculate when a target device will wake. This can allow a source device to hibernate until a target device wakes up, for example.

According to another embodiment of the invention, a system and method to provide alignment of hibernation and active cycles is provided. When one device receives a beacon from one of its neighbors it can be implemented to check for the neighboring device's global cycle start countdown value and to compare it's global cycle start countdown value with its own. If the beacon from the neighboring device contains a global cycle start countdown value that is different from the device's own global cycle start countdown, the device can be implemented to check a predefined condition. For example, if a device's global cycle start time falls into the first half of a neighbor's global cycle, then the device changes its own global cycle start time to the global cycle start time of that neighbor. Otherwise, the device does nothing.

According to another embodiment of the invention, a system and method to provide alignment of hibernation and active cycles is provided for multiple devices that are in range of each other. When one device receives beacons from other neighbor devices it can be implemented to check for the neighboring devices' global cycle start countdown values and to compare these global cycle start countdown values with its own. For example, if a device's global cycle start time falls into the first 256/K superframes of a neighbor's global cycle, then the device changes its own global cycle start time to the global cycle start time of that neighbor. Otherwise, the device does nothing. In one embodiment, K can be the number of different global active cycle start times observed by the device. In one embodiment a "tie-breaker" can be included for cases where two or more devices will be led to the same conclusion.

In some of the examples of the systems and methods described herein one device waking up at the same time or just before one or more other devices is discussed. It will be understood, however, that generally, the systems and methods described herein can be applied to any situation in which some overlap exists between one device being awake and one or more other devices being awake.

One example of a global access period, in terms of the example environment, can be the period of time during which a device is active and able to exchange WiNet broadcast or multicast control traffic such as, for example, Address Resolution Protocol ("ARP") packets. The phrase local access period of a device generally refers to the duration of time when or the time period during which the device is in the active mode and is ready to exchange local information. For example, in terms of the example environment, the period of time during which a device is active and able to exchange WiNet unicast packets (such as, for example, IP packets).

In one embodiment, a global access period Information Element ("GAP IE") is implemented, an example of which is shown in Table 1.

TABLE 1

GAP field format

| Bits: b15-b1 | b0 |
|---|---|
| GAP Countdown | GAP Status |

Figure 7:
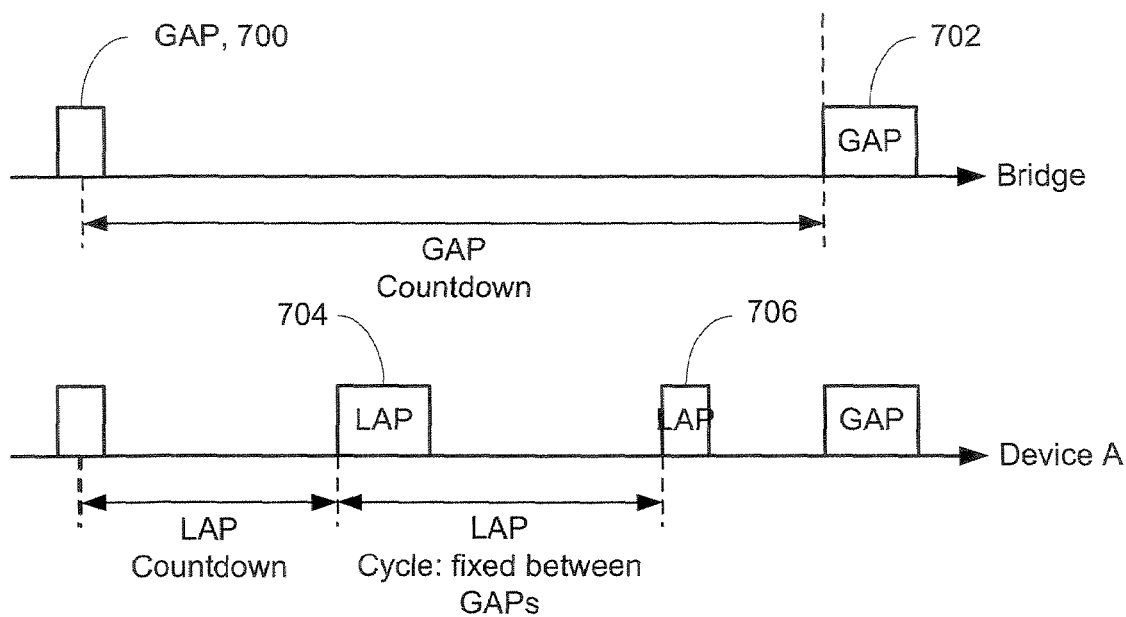
FIG. 7 is a block diagram illustrating another example of global and local access periods.

In this example, a global access period Status is set to "1" during the global access period. The GAP Countdown can be dynamically set to indicate the start of the next global access period. For example, the GAP Countdown can indicate the number of superframes until the start of the next global access period as illustrated in FIG. 7.

In one embodiment, the devices can be implemented such that the WiNet bridge (or other designated device) announces a GAP IE in its beacon. If a device is registered with a WiNet bridge, then that device can be configured such that it is active during the global access period announced by GAP IE of that bridge. The device can also include the received GAP IE in its beacon with a GAP Countdown decremented by 1.

If a device is not registered with a bridge, and it receives a beacon that contains a GAP IE, that device can be configured so as to be active during the global access period announced by the received GAP IE. The device can also include the received GAP IE in its beacon with a GAP Countdown decremented by 1. If the device receives two or more beacons with different GAP IEs, the device can be configured to be active during the global access periods announced. For example, in one embodiment the device is active during the unions of global access periods announced in the received GAP IEs. Because the device is active during all global access periods, the device can announce any of the received GAP IEs with adjusted Countdown field as above.

If a device is not registered with a bridge, did not receive any GAP IE, and its beacon slot number is the smallest in all Beacon period occupancy Information Element ("BPOIE") transmitted or received by that device, then that device can create a new GAP IE and include it in its beacon. The device that creates the GAP IE is called the owner of announced global access period.

Preferably, devices should transmit their broadcast and multicast control traffic as early as possible in the global access period. In one embodiment, the owner of the global access period can decide on the global access period duration by simply timing out on not receiving control traffic. Thus, in one embodiment, if no broadcast or multicast control traffic is received or transmitted during a predetermined period the owner may terminate the global access period. For example, the predetermined period can be some number of superframes. In one embodiment when no broadcast or multicast control traffic is received or transmitted during the last mGAPtimeout superframes, where mGAPtimeout is some predetermined number of superframes, the owner may terminate the global access period. In one embodiment, however, the global access period duration is not less than some predetermined minimum or longer than some predetermined maximum. For example, in one embodiment, the global access period duration is not less mMinGAP or longer than mMaxGAP. mMinGAP and mMaxGA can be predetermined numbers.

It will be understood, however, that in another embodiment, the owner of the global access period can decide on the global access period duration by simply timing out on not receiving control traffic after some period of time that is not predetermined. Thus, the timing out can be based on no broadcast or multicast control traffic being received or transmitted and other factors. Thus, in one embodiment the time is not a predetermined period.

The GAP Countdown can be used to dictate the frequency of global access period. The bridge or device that creates the GAP IE can use historical data of broadcast and multicast WiNET control traffic into account in deciding the GAP Countdown. FIG. 3 is an Example illustrating one definition of LAP Countdown, LAP Cycle, and GAP Countdown.

One embodiment of the LAP Information Element ("LAP IE") format is shown in Table 2, where the LAP Status is set to "1" during the local access period. The LAP Countdown can be dynamically set to the number of superframes until the start of the next local access period. LAP Cycle is the number of superframes between the starts of two local access periods (See FIG. 3).

TABLE 2

LAP field format

| 2 bytes | B15-b1 | b0 |
|---|---|---|
| LAP Cycle | LAP Countdown | LAP Status |

LAP IEs can be used to help source devices decide when their corresponding receivers are active and ready to receive traffic. The LAP IE is preferably implemented to be heard by all neighbors and so LAP IEs can be transmitted during every global access period. In one embodiment, a device is configured to enter into the active mode at the start of its local access period. A device that enters the active mode can stay in the active mode in the current superframe if the device has received traffic in the previous superframe. On the other hand, a device can leave the active mode if the device has not received traffic in some number of previous superframe(s), some period, etc. This period can be fixed, variable, depend on multiple factors, or only depend on traffic. For example, if at least mLAPtimeout (say 2) superframes have passed without receiving any WiNet traffic, the device may go into the hibernation mode. Source devices should send their traffic as early as possible in their receivers' local access periods. The LAP Cycle field can be changed only during the global access period. Thus, a source device that hears its receiver's LAP IE has enough information about its receiver active/hibernation modes for the entire duration between global access periods. In one embodiment, the LAP Cycle dictates the frequency of local access period and devices can recommend (through some control command) a certain LAP Cycle to their corresponding receivers. This cycle should capture the source traffic characteristics.

As the above examples illustrate, in one embodiment to receive broadcast traffic (i.e., ARP), network devices should be in the active mode. The global active period ("GAP") can be used in the above-described embodiments as one mechanism for providing an interval during which devices (all devices in one embodiment) are set to be in the active mode.

To receive unicast traffic, a sender should know whether the destination is active, or if not, when it will be active. Therefore, in one embodiment devices are configured to announce when they will be active, i.e., their local active period to receive traffic. In the example environment, for example, WiNET sources can use their destinations' local access period to schedule unicast transmission.

As stated above, in one embodiment the bridge announces the global access period in its beacon. If no bridge is present, the neighborhood global access period can be defined as the first X superframes of the local access period of the device with the smallest beacon slot number.

It may be useful for devices to propagate the learned global access period. Therefore, in one embodiment a device can be configured to announce broadcast traffic in the global access period. It is interesting to note that global access periods misalignment may result in more active time. Although this may not break the scheme, it may result in less energy saving (due to the need for more than one global access period).

Figure 5:
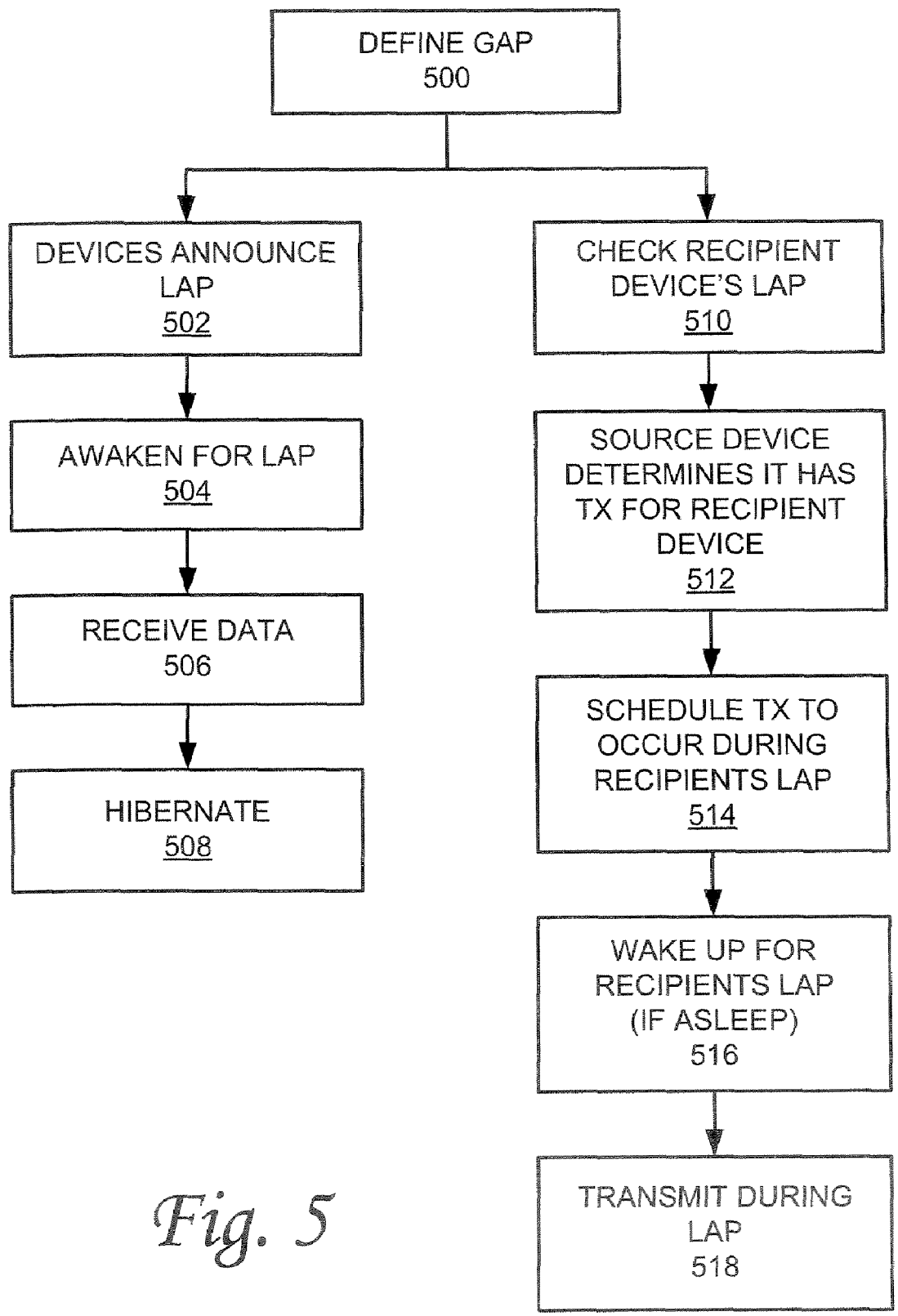
FIG. 5 is a flowchart illustrating one example method in accordance with the systems and methods described herein.

As the above examples illustrate, there are numerous techniques for implementing various embodiments of the present invention. FIG. 5 is a flowchart illustrating one example method in accordance with the systems and methods described herein. The global access period can be defined in a step 500. During a global access period multiple devices can be in an active mode. This can allow each device to be communicated with, assuming each device is in range, functioning correctly, powered on, etc.

The duration of the global access period can be based on traffic. For example, after not transmitting or receiving traffic for more than y superframes, the global access period can end. Further, the countdown to the next global access period can be based on historical data related to broadcast traffic.

The global access period can be created by a bridge device. The bridge device can announce the global access period in its beacon. Thus, any device that receives the bridge device beacon can determine the global access period. In some cases devices can be out of range of the bridge and thus, unable to receive the bridge device's beacon. If the out-of-range devices are within range of other devices in the network that are in range of the bridge then the learned global access period can be propagated from the bridge to the in-range device and from the in-range device to the out-of-range devices. In some cases it can take multiple "hops" for an out-of-range device to learn the global access period.

In one embodiment, if no bridge is present, the Neighborhood global access period can be the first X superframes of the local access period of the device with the smallest beacon slot cycle. It will be understood, however, that many other Neighborhood global access periods can be defined depending on the particular implementation. For example, the Neighborhood global access period can be the first X superframes of the local access period of the device with the largest beacon slot cycle, the last X superframes of the local access period of the device with the smallest beacon slot cycle, etc.

In one embodiment any device can announce broadcast traffic in the global access period. For example, in a step 502 each destination device can announce its local access period. In one embodiment a destination can change its local access period every global access period. By announcing a local access period during a global access period it can be more likely that a source device in a network will receive the information. This is because all devices should be active during the global access period and as indicated by a step 510 a source device can check for a recipient device's local access period, for example, during the global access period. By checking during a receiver device's known global access period a source device can reduce the amount of time that it spends in the idle state waiting for its destination to become active because, for example, the source can wake from hibernation at the same time that the destination awakens from hibernation.

At some time, in a step 512, the source device can determine that it has traffic for the recipient or receiver device. This determination can generally be at any time. For example, if the source determines that it has traffic for the recipient device at the end of a local access period, perhaps too late for transmission during that local access period, the source device can wait until the next local access period.

During a step 504 a device can awaken, e.g., enter an active mode, for its local access period. During this time a source device can schedule a transmission, a step 514. Generally the transmission can be scheduled for some time during the current local access period, however, in one embodiment, transmissions can occur in subsequent local access periods. In a step 516 the source device can wake up, if it was asleep and in a step 518 the source device can transmit information to the device, e.g., during the current local access periods. Thus, the device can receive the data, a step 506 and then hibernate, a step 508.

In one embodiment a source can transmit its traffic early in a receiver's local access period so that, for example, so that the receiver device can hibernate sooner after there is no data left to be transmitted. In this way power can be conserved because the local access period can be shorter. In one embodiment a receiver device can stay active (e.g., extend the local access period) as long as there is data buffered for transmission or reception.

In one embodiment, a source can recommend a certain LAP Cycle for destination devices, for example, in cases where the data is to be transmitted in a subsequent local access period. The recommendation can depend on, for example, application latency, buffer space, etc.

Figure 6:
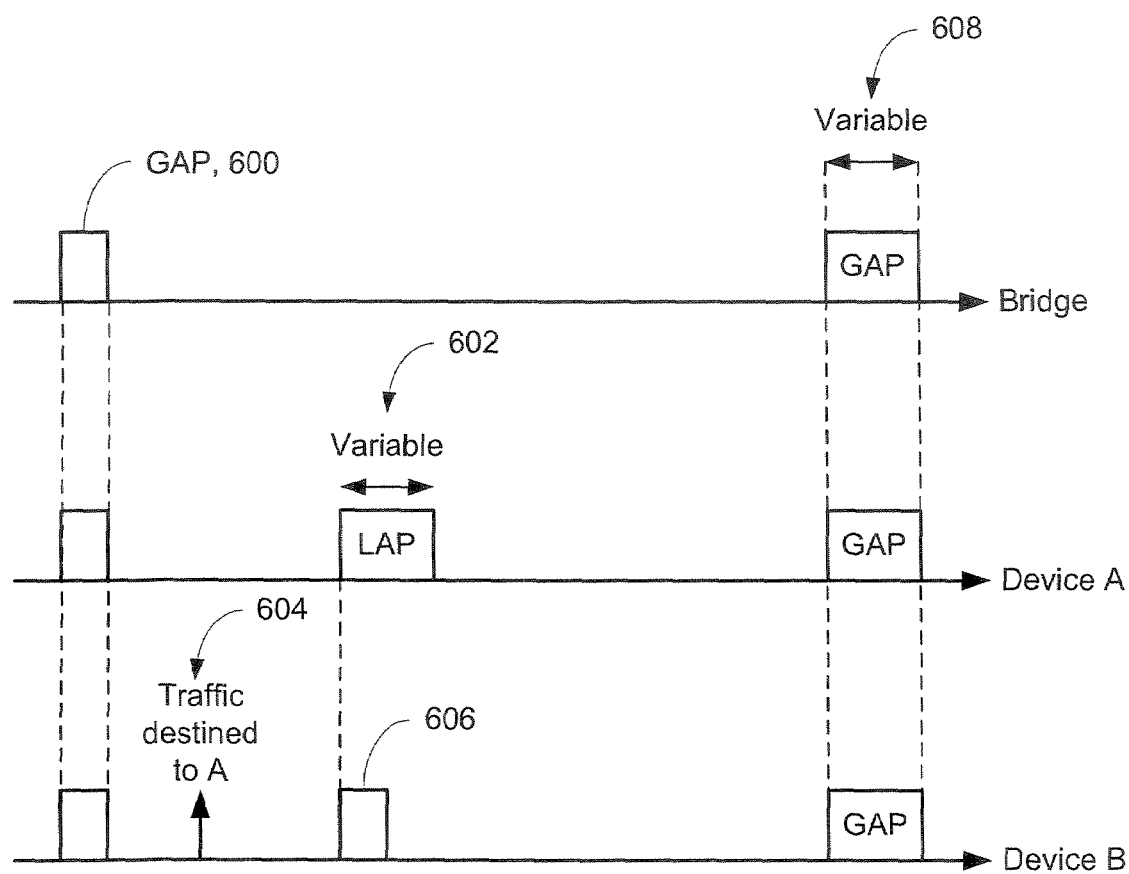
FIG. 6 is a block diagram illustrating example of global and local access periods.

FIG. 6 is a block diagram illustrating an example of global and local access periods. The diagram illustrates the global and local access periods for three devices, a bridge device, a device "A" and a device "B". Time increases from left to right across the page. At 600 a global access period for each device occurs. During the global access period device A can transmit a local access period. For example, during the global access period 600 device A can transmit information indicating that it will have a local access period 602 at some later time.

The local access period can be fixed or variable. For example, it can be increased if more data is expected to be received or decreased if less data is expected to be received. For example, after not transmitting or receiving traffic for y superframes, the device can hibernate. The value of y can be, for example, any integer number (e.g., 2). Thus, assuming that the LAP period was p, the invention can be implemented such that the device is unnecessarily active for no more than y/p during each local access period. In one embodiment the value of "y", the number of superframes not transmitting or receiving traffic, for the local access period can be the same as the value of "y" for the global access period, as indicated by the use of the same variable, "y". It will be understood, however, that in other embodiments that two waiting periods can be different.

At some time indicated by 604 Device B can determine that it has traffic destined to Device A. Because Device B knows when Device A's local access period occurs, it can wait to transmit the traffic until the start of the local access period 602 as indicated by transmission 606. This transmission can be at the start of the global access period 602, In this way, the length of time of the local access period can be lowered. At 608 the next global access period can occur. As discussed above, the global access period can be variable, as indicated on the figure.

FIG. 7 is a block diagram illustrating another example of global and local access periods. A first global access period 700 is shown. global access periods 700 and 702 can occur periodically, for example, they can occur based on a GAP countdown timer. The GAP countdown timer can vary depending on, for example, historical data on broadcast traffic.

During this global access period 700, device A can indicate when its local access periods 704 and 706 will occur. Similarly to the global access periods 700 and 702, local access periods 704 and 706 can occur periodically based on a LAP Countdown timer. The LAP countdown timer can vary depending on, for example, historical data on broadcast traffic. In one embodiment, however, the LAP countdown timer only varies every global access period 700 and 702 because this is when the local access period info ration is transmitted to other devices. Thus, the cycle can be fixed between global access periods.

Figure 8:
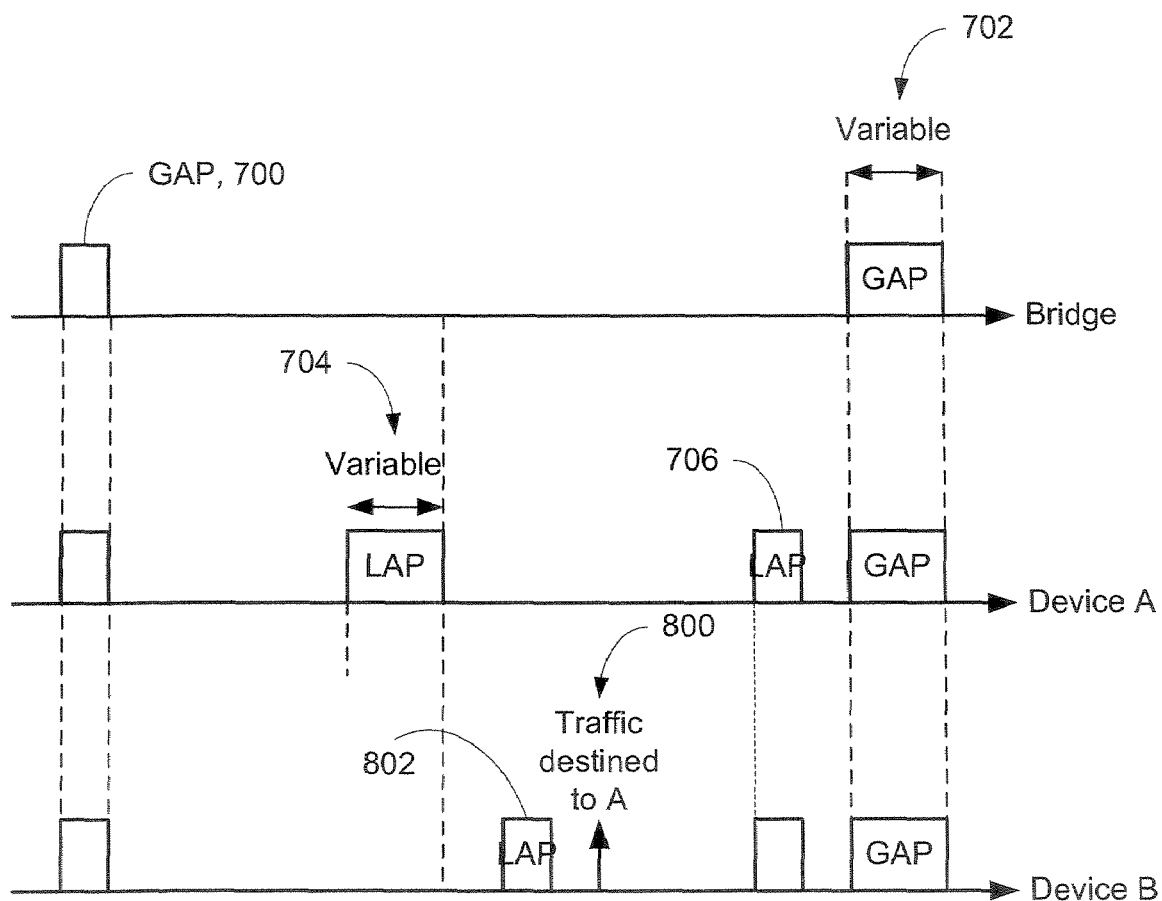
FIG. 8 is a block diagram illustrating another example of global and local access periods.

FIG. 8 is a block diagram illustrating another example of global and local access periods. FIG. 8 is similar to FIG. 7. Specifically, the example for the Bridge and Device A are the same. In the example of FIG. 8 Device B has traffic for Device A. (Recall that this is similar to FIG. 7). In the example of FIG. 8 device B determines that it has traffic for Device A at 800, after Device A's first local access period 704 and after Device B's first local access period 802. Device B may have determined it has traffic for Device A because, for example, it received the traffic from another device during it's local access period 802. Device B can transmit it's traffic during local access period 706. Device B knows when Device A's local access periods will be because the local access periods can be transmitted during global access period 700. Additionally, the periodicity of the local access periods can be transmitted during the global access period. Thus, Device B can determine when, for example, local access period 704 is going to occur (or when it occurred) and based on the periodicity, when local access period 706 is going to occur (or when it occurred). Thus, when Device B determines that it has traffic for Device A it can determine when it might be able to transmit that traffic to device A based on when the next local access period is scheduled to occur.

In one embodiment a network device can communicate with all of its network neighbors. A network device's neighbors can be, for example, any other network devices that are operating under the same or similar networking standards such that communication between the devices is possible and where the devices are in range of each other. Because many of these types of devices can be portable, a device's neighbors can change from time to time.

In one embodiment communication between neighbors can be delivered by unicasting multiple copies of the same traffic. An example of one device, device "D", communicating with multiple devices, "A", "B", and "C" is shown in FIG. 9.

Figure 9:
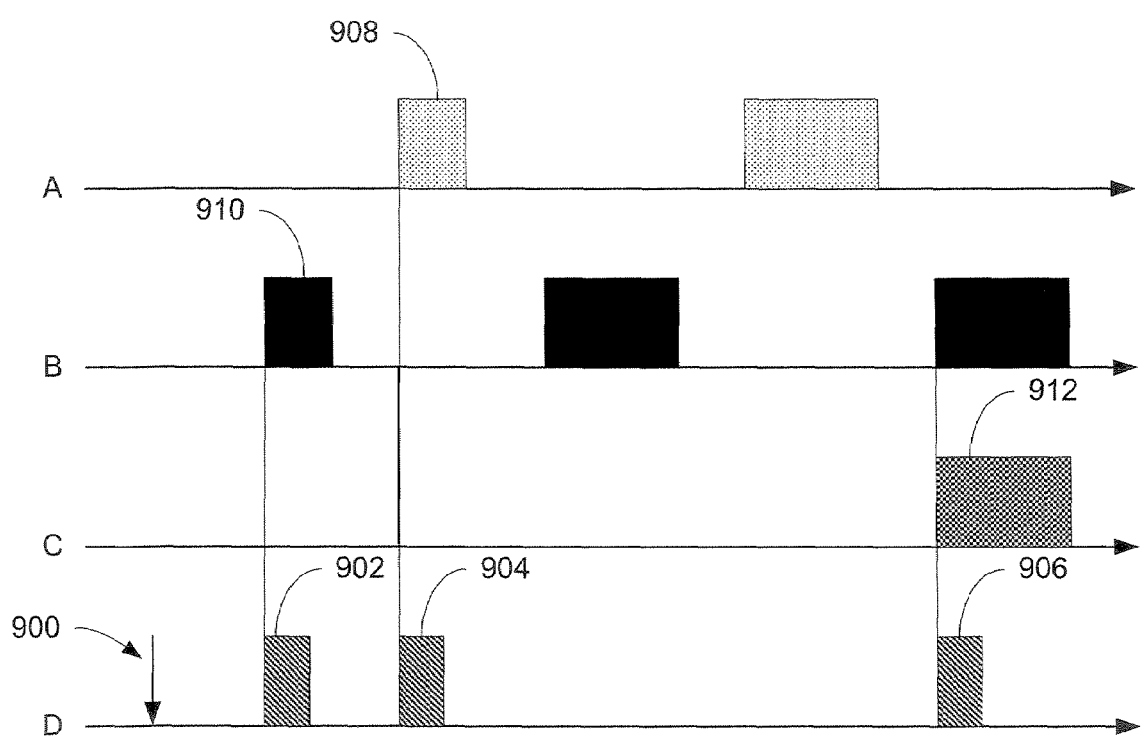
FIG. 9 is a block diagram illustrating an example of one device communicating with multiple devices.

FIG. 9 is a block diagram illustrating another example of global and local access periods. As illustrated in FIG. 9 a broadcast traffic request 900 can be sent. In response to the broadcast request 900 device "D" can send messages 902, 904, and 906. These messages 902, 904, and 906 can be sent during local access periods for devices "A", "B", and "C", 908, 910, and 912 respectfully. For example, in one embodiment an IP can send an ARP request to WiNet.

It can, however, in some embodiments, be advantageous to send traffic one time, (multicasting) rather than unicasting multiple copies. This can, for example, cut down on the amount of time a source needs to be active.

In one embodiment a mechanism can be implemented to allow some level of access period overlap to occur among devices. For example, in one embodiment the relationship between global access periods and local access periods for different devices within a network can be defined by a set of mathematical equations such that two or more devices within a neighborhood in a given network have overlapping global access periods, local access periods, or both.

Figure 10:
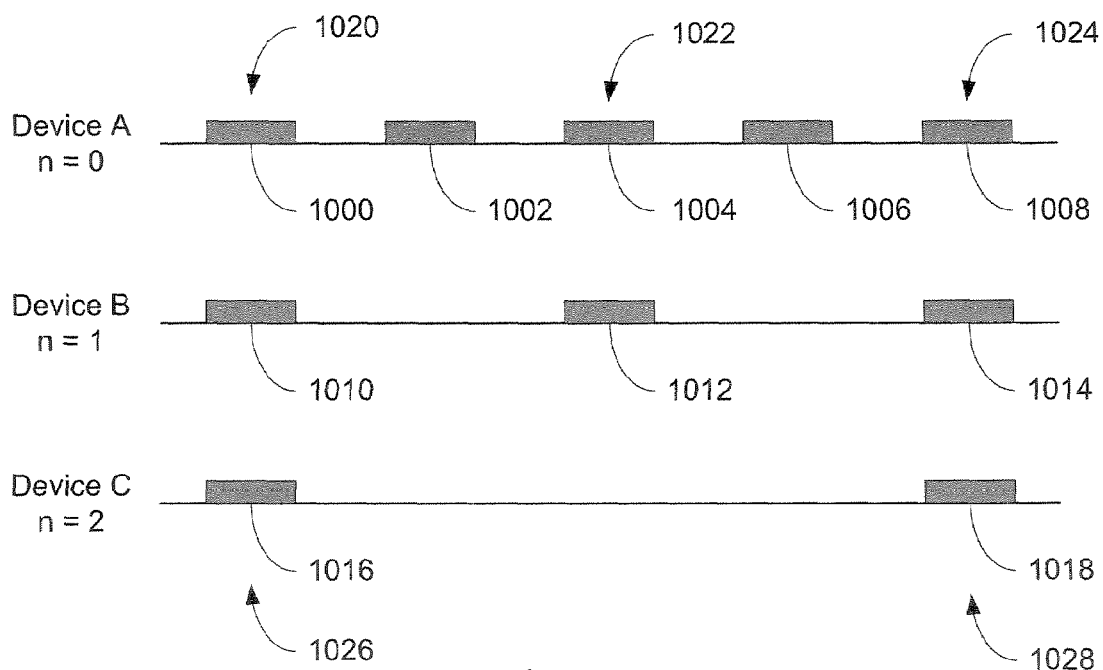
FIG. 10 is a block diagram illustrating an example of overlapping global access periods.

FIG. 10 is a block diagram illustrating an example of overlapping global access periods in which Device "A" and Device "B" are in the same neighborhood, in other words, they can "hear" each other, e.g., they are in range such that that they can send and receive transmissions to each other. Device "B" and Device "C" are also in the same neighborhood, e.g., they are in range such that that can send and receive transmissions to each other. Note that in this example, Device "A" and "C" cannot hear each other. They are out of range such that they cannot send and receive transmissions to each other. At least not directly. They might be able to, however, send transmission to each other using, for example, Device "B" as an intermediary.

Each device in a network can announce a local access period. This can be the time when a device is active and ready to exchange packets. Examples illustrating local access periods relative to various global access periods are illustrated in FIGS. 6, 7, and 8. In one embodiment the timing of one or more local access periods can be defined using equations or other relationships such that one or more local access periods for two or more devices overlap.

For example, a LAP Cycle, the periods between two consecutive local access periods, can be defined using a periodic equation. One such equation is:

$$LAP \text{ Cycle Period} = \Delta * 2^n \tag{EQ1}$$

In the equation above n=0, 1, 2, . . . , N, where N and $\Delta$ can be fixed. For example, N and $\Delta$ can be numbers that are predetermined for a given network, a given set of network devices, etc. In one embodiment the devices can be configured to become active every $\Delta * 2^n$ superframes. The frequency (n) can be determined based on, for example, incoming or outgoing message traffic, power consumption needs, etc. Further, in one embodiment, n can be determined individually for each particular device.

The resolution of a particular embodiment, $\Delta$, can be an integer (e.g., $\Delta$=4). The resolution is the minimum number of superframes in a LAP cycle. Thus, for $\Delta$=1 the minimum number of superframes in a LAP cycle is 1. (The LAP cycle is 1 when n=0.) For $\Delta$=2 the minimum number of superframes in a LAP cycle is 2. (The LAP cycle is 2 when n=0.) Etc.

N can be a fixed number that can be based on the communication standard for a given set of devices in a network. For example, N can be set by the MAC Standard maximum hibernation time (e.g., N=8).

Thus, LAP cycles can be indexed such that there can be a time period when all neighbors of a device within a given network are active. For example, every device can advertise in its beacon (as part of WiNet ASIE for example) its LAP Cycle, n, and an Active Cycle Start Time ("ACST"). The Active Cycle Start Time is the number of super frames until the device starts a new hibernation/active cycle. This can be similar to Beacon Period Start Time ("BPST"). A hibernation/active cycle can be $\Delta*2^n$ superframes.

When a device is turned on, powers up, etc. it can join a beaconing group in a certain channel. If the device joins a beaconing group in a certain channel, it can select the Active Cycle Start Time that is advertised for that beaconing group. If the device does not receive any beacon with an Active Cycle Start Time the device can select an Active Cycle Start Time. Merging devices can adopt the Active Cycle Start Time of the devices that they merge with. (similar to BPST).

Returning to FIG. 10, each device in a neighborhood, Devices A and B or Devices B and C, for example, can announce a global access period. This can be the time when, for example, A, B, and C are active and ready to exchange packets. Similarly to local access periods, in one embodiment global access periods can be defined using equations. One such equation can be derived from the local access periods equation. Recall that:

$$LAP \text{ Cycle Period}=\Delta*2^n \quad (EQ1)$$

If m is the maximum of all local access periods indexes of any neighbors (e.g., $\max(n_i)$) then the global access periods can be defined as:

$$GAP \text{ Periodicity}=\Delta*2^m \quad (EQ2)$$

In other words, the GAP Periodicity should be at least as long as the maximum LAP Cycle Period, otherwise some devices might never have a local access period between global access periods because the global access period would end first. In one embodiment the global access period is the time when a device should send its broadcast/multicast control traffic related to the active cycle start time. Further, the global access period can be defined based on the neighbors of each device. Thus, various devices can have different global access periods based on the neighbors they "hear." For example, one global access period for one neighborhood, another global access period for another neighborhood.

Recall that, in FIG. 10, it was assumed that A and B can hear each other, B and C can hear each other, but that A and C cannot hear each other. Thus, A's neighborhood includes B, B's neighborhood includes both A and C, and C's neighborhood includes B. In other words, even though A and C are both in B's neighborhood, they are not in each other's neighborhood. Thus, A's global access period can be based on B (and any other devices it "hears"). C's global access period can also be based on B (and any other devices it "hears"). B's global access period, however, can be based on both A and C (and any other devices it "hears"). This will be discussed in more detail below with respect to the specific example of FIG. 10.

In one embodiment information related to a local access period can be stored in a LAP IE that is a 2 byte field. For example:

TABLE 3

LAP IE field format

| xxx | (8 + log2Δ) bits | b2-b0 |
|---|---|---|
| reserved | ACST | n |

Again, the local access period can be variable. For example, it can be increased if more data is expected to be received or decreased if no more data is expected to be received. For example, after not transmitting or receiving traffic for y superframes, the device can hibernate. The device can examine the TIM IE when determining if it should hibernate.

In one embodiment devices can negotiate LAP Indices. This can allow the devices to determine the optimal activity period amounts themselves. For example, based on the amount of traffic. As discussed above, a source can recommend a certain LAP cycle for destination devices that it has traffic for, in other words, a source can recommend a value for n. The value recommended can, for example, depend on application latency requirements, buffer space, power consumption, etc. In some embodiments devices can change their LAP cycle only during a global access period when all or most of the other devices can hear the change.

In FIG. 10 assume that A and B can hear each other and that B and C can hear each other. Further assume that A and C cannot hear each other. Recall that the LAP Cycle Period is $\Delta*2^n$. For this example, assume that $\Delta=4$ superframes. Thus, Device A's a local access period 1000, 1002, 1004, 1006, and 1008 will occur every 4 superframes. (For Device A n=0, thus $4*2^0=4$). Because, for Device B n=1, Device B's a local access period 1010, 1012, and 1014 will occur every 8 superframes. ($4*2^1=8$). Because, for Device C n=2, Device C's a local access period 1016 and 1018 will occur every 16 superframes. ($4*2^2=16$).

The global access period can be defined at any point in which all relevant devices in a given neighborhood are active. Typically, in one embodiment, this might occur at the same time as the local access period for the device or devices with the longest LAP cycle time. Therefore, in one embodiment, the global access period occurs at the maximum LAP index for the set of relevant neighbors.

Figure 11:
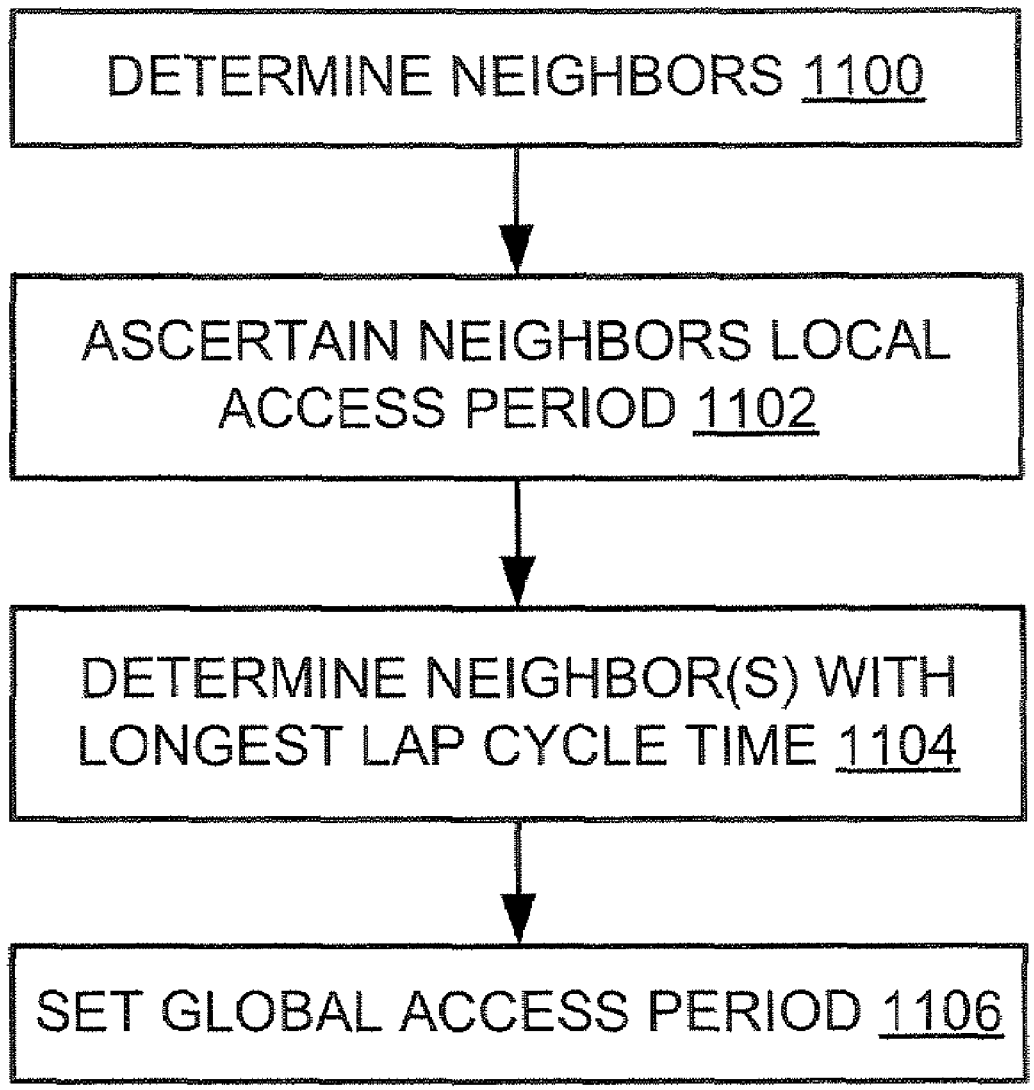
FIG. 11 is a flowchart illustrating an example method for setting a global access period.

Referring to FIG. 11, an example method of determining a global access period will now be discussed. In a step 1100 a device can determine its relevant neighbors. In one embodiment these can be any devices within range that are part of the same network, however, in another embodiment fewer than all devices within range and part of the same network may be considered to be relevant neighbors. In a step 1102 the device can determine which neighbor or neighbors have the longest LAP Cycle Time. Thus, in one embodiment, the global access period can be set as the maximum LAP index for the set of relevant neighbors in a step 1106.

An example of determining global access periods that can use, for example, the steps of FIG. 11 will now be discussed with respect to FIG. 10. Thus Device A's global access periods 1020, 1022, and 1024 occurs every 8 superframes. This is because A and B can hear each other and B has the larger local access period index. Thus, for Device A to communicate with device B it can have a global access period that coincides with when Device B will be communicating, e.g., during the 1, 8, 16, etc. superframe. Similarly Device B's global access period's 1026 and 1028 occur every 16 superframes based on device C's larger local access period index.

It will be understood that while the example above illustrates sending traffic one time rather than unicasting multiple copies, in another embodiment, a combination of multicasting and unicasting or a combination of more than one multicast can be used in some embodiments.

As noted above, with many communication devices, active and hibernation modes may be specified to allow devices to power down some or all of their functionality such as, for example, to conserve power. For example, according to the WiNet specification, a device periodically goes into active mode. The periodicity of going into active mode is referred to as the local cycle. In one embodiment, a WiNet device can choose the value of its local cycle according to the following formula:

$$\text{Local cycle} = 2^n \text{ superframes,} \qquad (EQ3)$$

where n is the local cycle index, i.e., frequency; $0<=n<=\text{wMaxLocalCycleIndex}$.

As noted above, in order to synchronize with neighbors' local cycles, a device can be configured to maintain a global cycle start time for its neighbors. A new global cycle can be started every $2^{wMaxLocalCycleIndex}$ superframes. The device can set the global cycle start countdown ("GCSC") field in its WiNet Identification Information Element to the number of superframes before the start of the next global cycle, not including the current superframe. In one embodiment, the global cycle start countdown value is $(2^{wMaxLocalCycleIndex}-1)$ in the first superframe of every global cycle and is decremented by 1 in every subsequent superframe. A value of zero indicates a new global cycle will start at the end of the current superframe.

If two devices that have different global cycle start times came into range the two devices might need to align their global cycle start times. In order for the two devices to align there global cycle start times the devices might need to be in the active mode for longer than they would be if their global cycle start times are aligned. This can result in a greater expenditure of energy. Thus, one embodiment of the invention enables alignment of global cycle start times.

For example, in one embodiment the systems and methods described herein can be applied to devices that implement the WiNet specification. The WiNet specification does not provide a mechanism to synchronize different global cycle start times. So if two devices that have different global cycle start times came into range, the WiNet protocol does not specify how the two devices align their global cycle start times. Therefore, such devices might need to be in the active mode for longer than they would be if their global cycle start times are aligned. This can result in a greater expenditure of energy. Thus, one embodiment of the invention enables alignment of global cycle start times.

According to one embodiment of the invention, a system and method to provide alignment of hibernation and active cycles is provided. In one embodiment, this can be used to better enable devices to awaken at the same time, or temporally close to one another such that they can have overlapping (at least to some extent, if not entirely overlapping) active times. In terms of the example environment, in one embodiment, a mechanism to enable devices to align their global cycle start times is provided.

Figure 12:
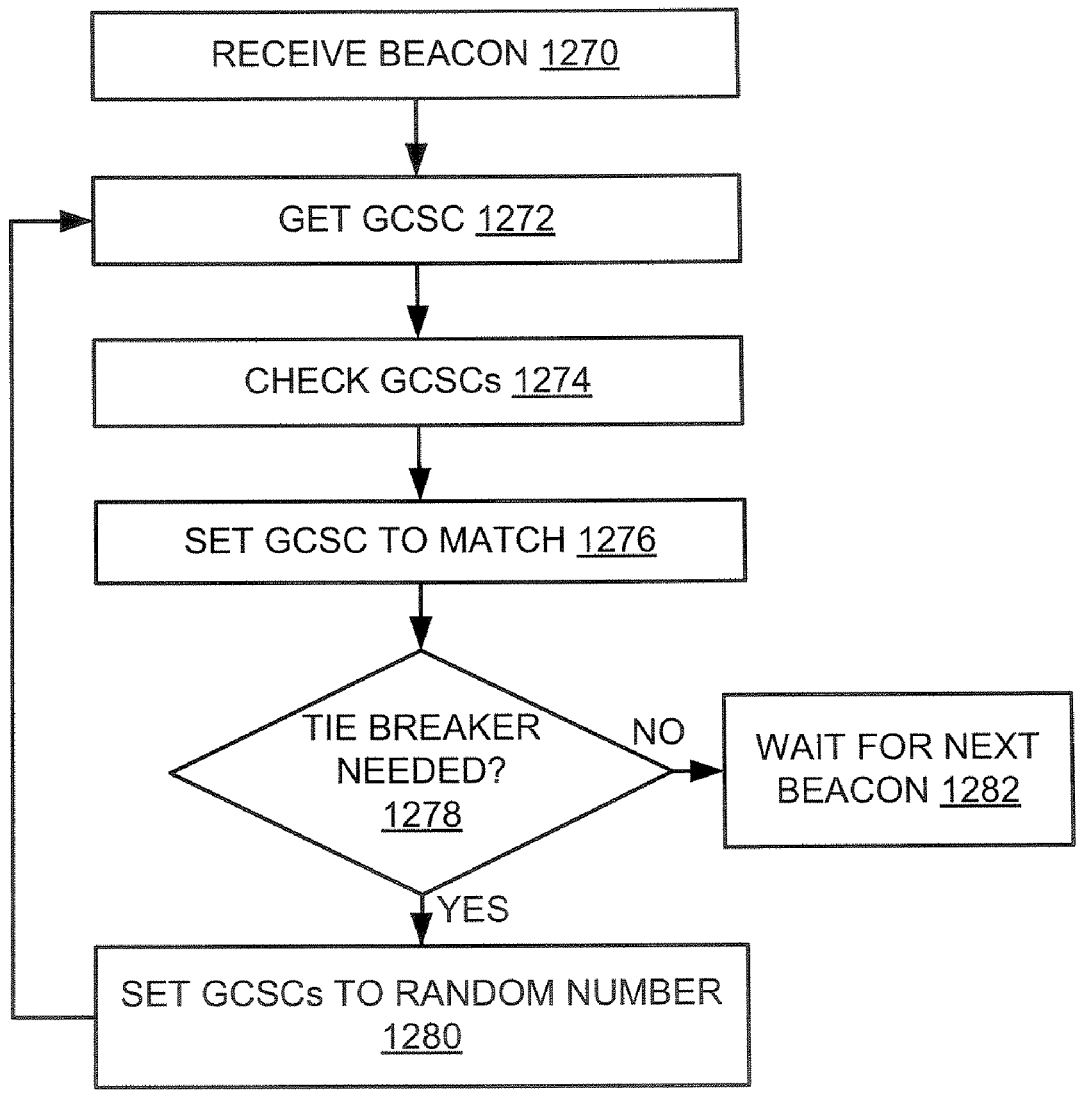
FIG. 12 is a flowchart illustrating an example method for alignment of hibernation and active cycles in accordance with the systems and methods described herein.

Referring now to FIG. 12, in one embodiment, when a device, D1, receives a beacon in a step 1270 from one of its neighbors, D2, device D1 can be implemented to get device D2's global cycle start countdown value in a step 1272 and to check it. In one embodiment, the check can be performed by comparing D2's global cycle start countdown value with its own countdown value in a step 1274. If the beacon from D2 contains a global cycle start countdown value that is different from the device's own global cycle start countdown, the device D1 in this embodiment can be implemented to check the following condition:

$$[GCSCself - GCSCneighbor] \text{modulo } 256 < 128, \qquad (EQ4)$$

Where, GCSCself is the global cycle start countdown of the device that is checking the condition (D1 in this example), and GCSCneighbor is the global cycle start countdown of its neighbor (D2 in this example). Note, however, that in one embodiment both devices D1 and D2 can be configured to check this condition from their own perspectives. One of ordinary skill in the art would, after reading this description, understand how this checking can be performed among more than two devices and how other metrics can be chosen. Also note that in one embodiment the protocol can be implemented using either "less than" or "greater than" in (EQ4), as long as that choice is consistent for all devices.

For each device, if condition (EQ4) is satisfied, then the device sets its global cycle start countdown to match the global cycle start countdown of the other device 1276. Otherwise, the device does not change its global cycle start countdown. The above inequality translates to the following: if a device's global cycle start time falls into the first half of a neighbor's global cycle, then the device changes its own global cycle start time to the global cycle start time of that neighbor. Otherwise, the device does nothing.

Note that in one embodiment this condition (EQ4) is checked by both devices D1 and D2. In the example embodiment, however, the condition is designed such that it will become true for one or the other of the two devices, to help ensure that there won't be any instability in the this protocol, for almost all cases. However, there can be a corner case in which both devices will be led to the same conclusion. With the given metrics, there is a probability of $1/256$ that the two global cycle start times differ in exactly 128 superframes. This condition can be checked in a step 1278. In this case, both the device and its neighbor would end up with the same conclusion when executing the condition of (EQ4). Therefore, in one embodiment a tie-breaker can be included.

For example, in such a case, i.e., when $$[GCSCself - GCSCneighbor] \text{modulo } 256 = 128, \qquad (EQ5)$$

each device can be configured in one embodiment to set its global cycle start countdown for the next superframe to any random number between 0 and 255, and continue normal operation steps (e.g., 1272, 1274, and 1276 above). With a probability of $(1 - 1/256)$, condition (EQ5) no longer holds true.

Including this embodiment, with the test of condition (EQ4), the total proposed algorithm can be implement in one embodiment as the following:

1. At each superframe that a device is active, for each of its neighbors, the device checks condition (EQ4), steps 1272 and 1274. If condition (EQ4) is true, then the device shall set its global cycle start countdown to match the global cycle start countdown of the neighbor, step 1230.

2. Otherwise, the device checks condition (EQ5), e.g., step 1274. If condition (EQ5) is true, the device can:

a. Change GCSCself to a random value—for example, to a random integer uniformly distributed over the range [0, 255], step 1280.

b. Stay active for the next superframe (go to step 1372).

3. Otherwise, do nothing, step 1282.

Note that in one embodiment, staying active for the next superframe (see step 2b in the immediately above 3 steps) may not be specified in a protocol as two devices that intend to communicate will naturally stay active for the next superframe to conduct their network activities.

To further illustrate this technique, a few examples are now provided. In a first example, assume that devices A and B have just received each others' beacons, and that their global cycle start countdown values are 250 and 240, respectively.

Device A computes the left hand side of (EQ4) and the result is 10, so it matches its global cycle start countdown to the one of B. Device B computes the left hand side of (EQ4) and the result is 246, so it does nothing. Thus, in this case, the two devices have converged to the global cycle start time of device B.

Assume that during this time, device C, which is a neighbor of A and so its global cycle start countdown is the same as the original global cycle start countdown of device A, is hibernating. Assume that 245 superframes later, device C goes into the active mode. Device C's global cycle start countdown is now 5. Devices A and B's global cycle start countdown is now 251. C computes the left hand side of (EQ4) and the result is 246, so it must change its global cycle start countdown to match the one of B and A. Hence, in this example, all devices converged to one global cycle start time.

A second example illustrates the so-called "corner case." In this example, assume that devices A and B have just received each others' beacons, and that their global cycle start countdown values are 128 and 0, respectively.

Device A and B compute the left hand side of (EQ4) and the result is 128. So in accordance with the embodiment disclosed above, both devices pick a random number between 0 and 255. Assume, for example, that they picked 10 and 40, respectively. Both devices announce their choices in the next superframe.

Now, both devices again observe different global cycle start time. Particularly, using the example conditions above, device A computes the left hand side of (EQ4) and the result is 226, so it does nothing. Device B computes the left hand side of (EQ4) and the result is 30, so it must match its global cycle start countdown to one of the A. Thus, in this case, the two devices have converged to the global cycle start time of device A.

The example immediately above illustrates a "corner case." Devices A and B have just received each others' beacons and have global cycle start countdown values of 128 and 0, respectively, at the beginning of the example. This "corner case" example illustrates a scenario for aligning the global cycle start times of two network devices. This synchronization can be applied to more than two devices in single-hop and multi-hop networks. Therefore, example embodiments for each scenario are now described.

Figure 13:
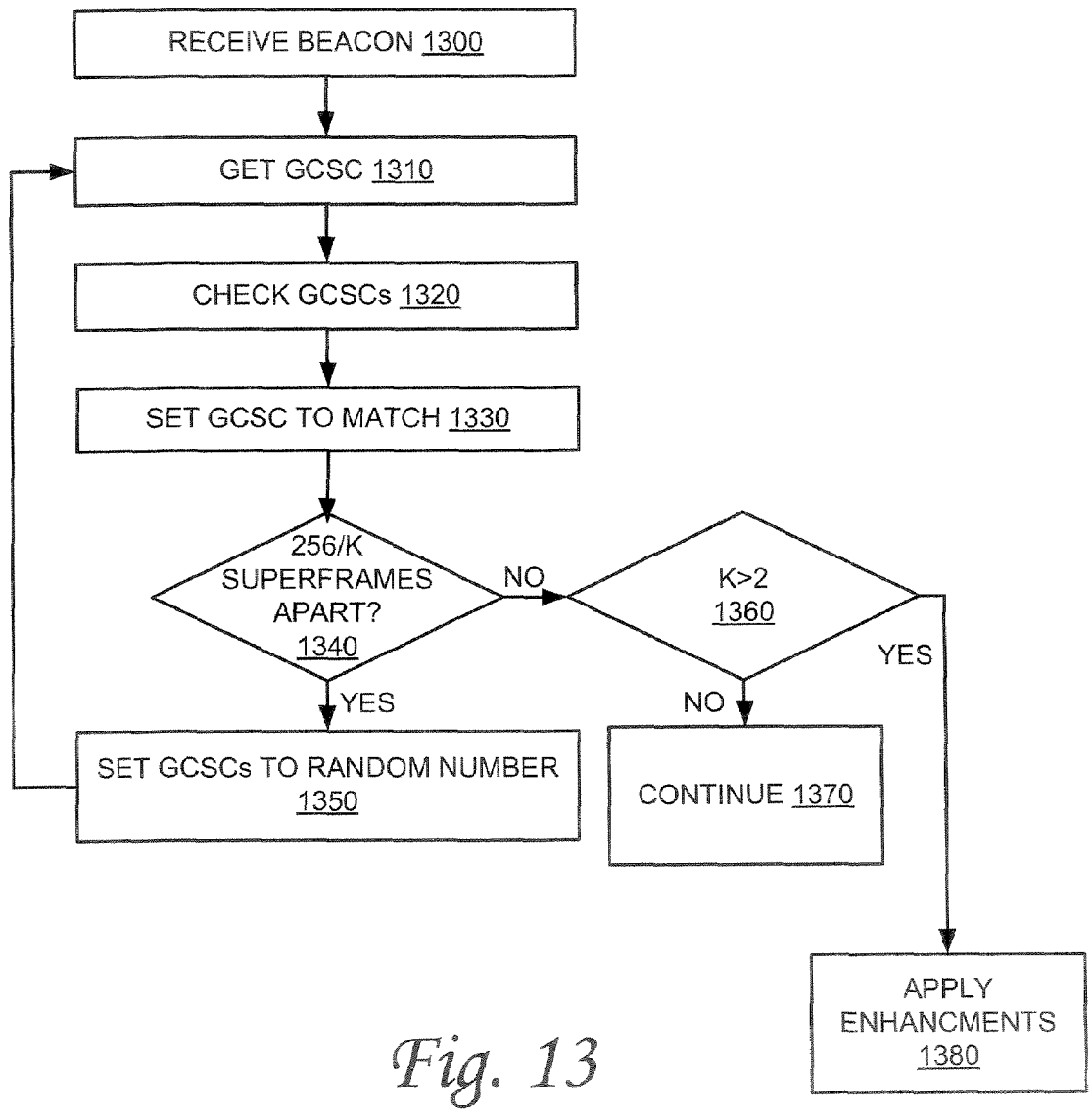
FIG. 13 is a flowchart illustrating another example method for alignment of hibernation and active cycles in accordance with the systems and methods described herein.

Referring now to FIG. 13, in one embodiment, when a device, D1, receives beacons 1300 from more than one of its neighbors, D2, D3, etc. it can be implemented to check for device D2, D3, etc.'s global cycle start countdown value in step 1310 and to compare the global cycle start countdown values with its own 1320. (Similar to FIG. 12).

Consider the case of a single-hop network. In such a network, consider an example of a network device in communicative contact with a plurality of other network devices, a step 1300. Let $GCSC_1, GCSC_2, \ldots, GCSC_K$ be the global cycle start countdown values that are received by a first network device in a superframe and that are different from that particular device's global cycle start countdown. The device can get the GCSC for each of the K devices. For every k, where $k=1, 2, \ldots, K$, the device shall (in step 1320):

1. Check the following condition:

$$[GCSC_{self} - GCSC_k] \text{modulo } 256 < 256/K, \quad (EQ6)$$

2. If condition (EQ6) is satisfied, then the device sets its global cycle start countdown to match $GCSC_k$. (Step 1330). Otherwise, the device does not change its global cycle start countdown.

In the above protocol, $GCSC_{self}$ is the global cycle start countdown of the device that is checking the condition. This protocol can be stated another way: if a device's global cycle start time falls into the first 256/K superframes of a neighbor's global cycle, then the device changes its own global cycle start time to the global cycle start time of that neighbor. Otherwise, the device does nothing. It should be noted that this example protocol can be implemented with "less than" or "greater than" in the test of equation (EQ6), but that choice is preferably consistent for all devices.

It should be noted that in some applications there may be a corner case, when the different global cycle start countdown values are exactly 256/K superframes apart, a step 1340. In one embodiment, when this case arises, each device is to set its global cycle start countdown for the next superframe to any random number between 0 and 255, step 1350 and continue normal operation: step 1 and 2 above. Otherwise the device can wait for the next beacon.

In cases where not all devices are in each others' ranges, the method explained above may not work. Referring back to FIG. 10, the following example illustrates a challenge that may arise with the above approach in a multi-hop network. Recall that A and C were neighbors, B and C were neighbors, and A and C were not neighbors. For example, the three devices, A, B, and C, can be in a line topology, A-B-C, where A and B are in communication range with each other, B and C are in communication range with each other, but C and A are not in communication range with each other. To illustrate the example, consider an example scenario wherein when these three devices hear each other for the first time, the global cycle start countdown value of A, B, and C are 0, 100, and 1, respectively. After each device applies the above two steps, none of the devices would decide to change its global cycle start countdown. Therefore, the global cycle start countdown values in this network would not be aligned.

Figure 14:
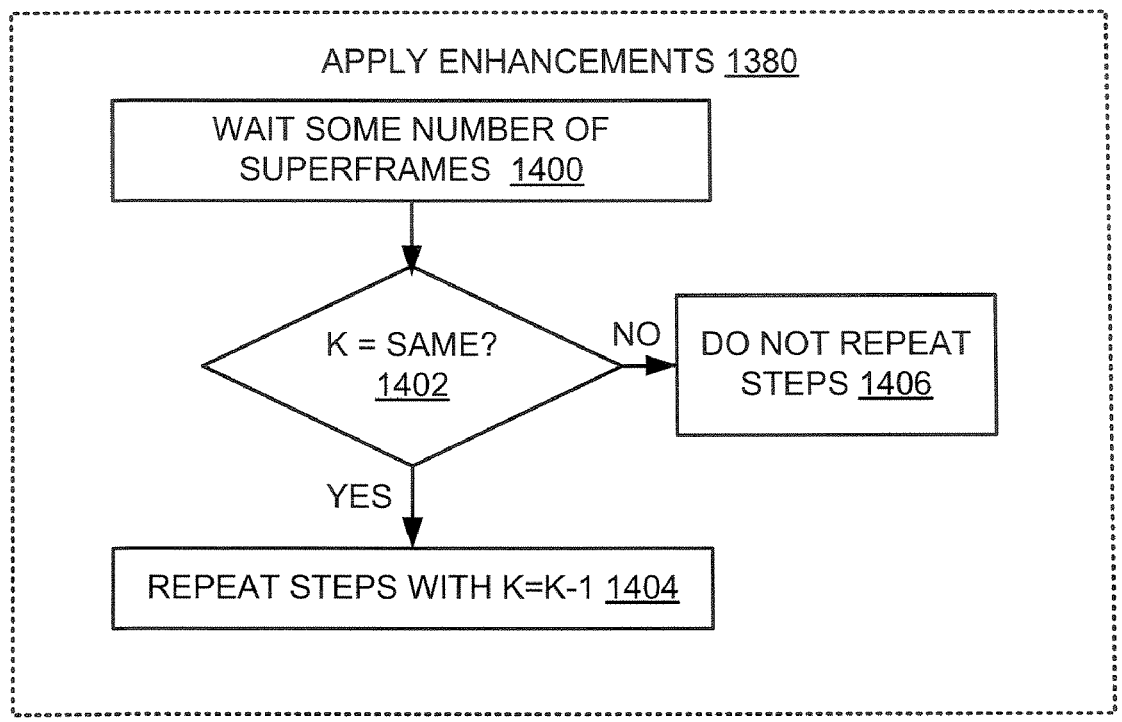
FIG. 14 is a flowchart illustrating additional details of one of the steps of FIG. 13.
Figure 15:
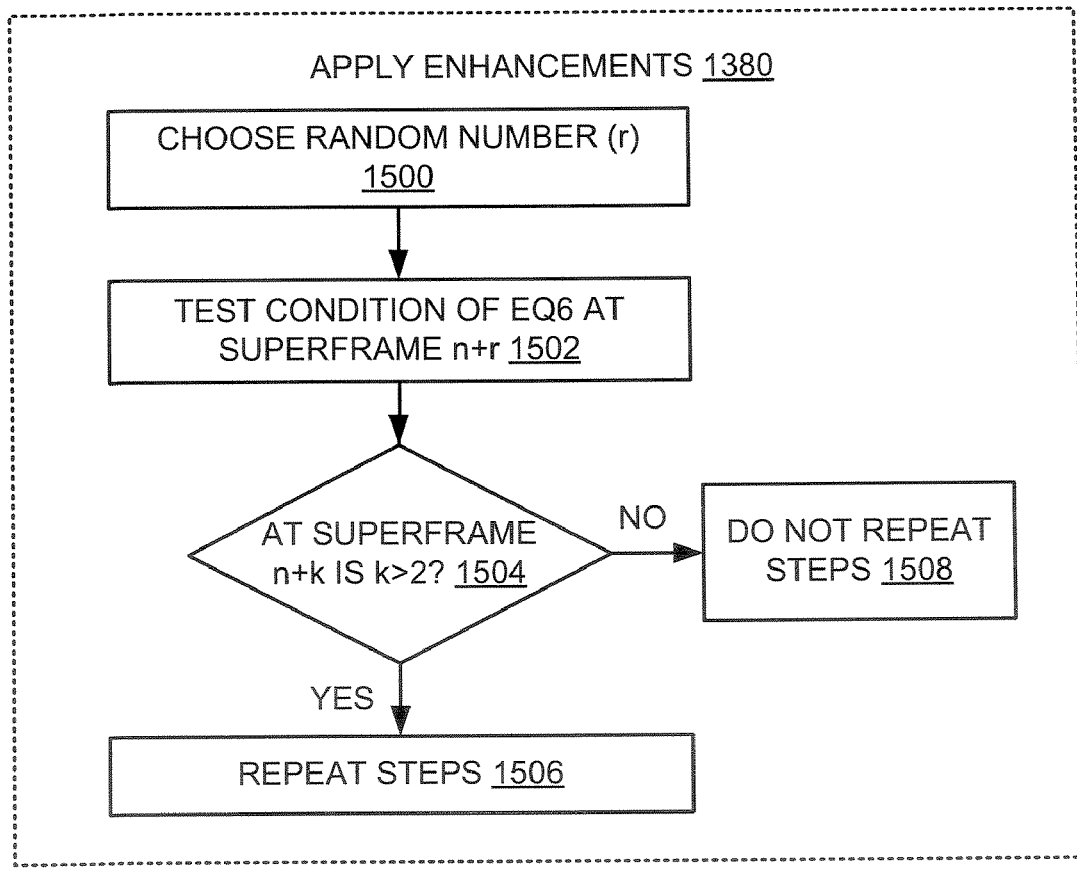
FIG. 15 is a flowchart illustrating additional details of one of the steps of FIG. 13.

Therefore, either one or a combination of the following enhancements or steps 1380 can be added to the above two steps in order to align different global cycle start countdown values in multi-hop networks. In one embodiment, a device applies the two steps explained above will be discussed. (The device checks the condition of EQ6 and if the condition is satisfied the device sets its global cycle start countdown to match $GCSC_k$.) But in addition, whenever the observed number of different global cycle start countdowns, K, is higher than 2, a step 1360, the device is configured to apply one or more enhancements 1180. Referring now to FIG. 14, one example enhancement 1180 will be discussed. Whenever the observed number of different global cycle start countdowns, K, is higher than 2 (step 1360), in one embodiment, the device can check again. The check can occur after a number of superframes, step 1400. In one embodiment the wait can be 3 superframes. If K is still the same in a step 1402 the device can apply the same steps but can replace K with K−1 in the Condition (EQ6) above in a step 1404. Otherwise, in a step 1406, the device may not repeat the steps with K=K−1.

One advantage of using K−1 in the Condition of EQ6 is that after one or more iterations, at least one device will match its global cycle start countdown with one of its neighbors. Let us reconsider the line topology example A-B-C. In this case, B will use K=3 in Condition of EQ6. But since after say 3 superframes, K is still 3, device B will use K=2 in Condition of EQ6, and this will result in B changing its global cycle start countdown to either A or C. So now the network of three devices has only two global cycle start countdowns, and global cycle start countdown alignment can be simply accomplished using steps 1 and 2. (This can be part of Step 1380).

In another embodiment, a device that sees k different global cycle start countdowns (where k>2 including itself, step 1360) in superframe n, it can be configured to choose a random number (r) in a step 1500. In one embodiment, r can be chosen to be between, for example, 1 and k, and the value for k can be chosen as, for example, the number of neighbors.

In a step 1502, at superframe n+r, the device tests Condition (EQ6) with the value of K=2 and in the order of devices in which the global cycle start countdowns were transmitted in that superframe. In a step 1504 when it is superframe n+k, if k is still larger than 2 the process is repeated in a step 1506. One advantage that might be achieved by this approach is that devices can be implemented to test Condition (EQ6) at different times, thus improving the chances of aligning global cycle start countdown values. (This can be part of Step 1380). If at superframe n+k k is not still greater than 2 then the steps may not be repeated, a step 1508.

In still another embodiment, a device that sees k different global cycle start countdowns (where k>2 including itself) in superframe n, then with probability 1/k, the device checks Condition (EQ6) assuming K=2. Preferably, this can be done in the order in which the global cycle start countdowns were transmitted in that superframe. In one embodiment, if the condition is satisfied, the device changes its global cycle start countdown to match its neighbor's global cycle start countdown with which the condition was satisfied. This process can be repeated until all global cycle start times are aligned. (This can be part of Step 1380). When K<=2 the method can continue at a step 1370, in other words, at least in some embodiments, the enhancements are not applied.

In accordance with another embodiment of the example environment and other communication environments, various hibernation protocols can be implemented. For example, in accordance with one embodiment, a device can be assigned an anchor device status to facilitate network synchronization or other network functions. After a device awakens, it can be configured to go into hibernation mode once the negotiation is over and if it has determined that is it not an anchor device. However, in some cases, a neighboring anchor may disappear (move away or get turned off) after the negotiation is over (e.g., the mobile anchor walks away). To address this challenge that is introduced by mobility, in one embodiment, after the negotiation is over, if a device wishes to go into hibernation mode, it can be configured to first check that an anchor device is still available. If not, then, in one embodiment the device can be required to stay in active mode to preserve power consumption. This can be implemented to occur every time the device wakes up and then wants to return to hibernation.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for a network device to perform network communications on an autonomous peer network, the network device having a neighborhood of neighbor devices, the method comprising:
   the network device broadcasting a first schedule for its own periodic local communication windows to the neighborhood;
   the network device receiving schedules for neighbor devices' periodic local communication windows from neighbor devices of the neighborhood;
   the network device examining the received schedules for neighbor devices' periodic local communication windows and the first schedule of its own periodic local communication windows and determining a schedule for global communication windows corresponding to a schedule of local communication windows having a lowest frequency of occurrence of the examined schedules; and
   during a scheduled global communication window, the network device broadcasting a second schedule of periodic local communication windows to the neighborhood.

2. The method of claim 1, further comprising:
   the network device waking from a hibernation state at a predetermined time for a scheduled local communication window;
   the network device receiving a transmission from another device in the set of neighbor network devices during the scheduled local communication window; and
   the network device returning to the hibernation state after the scheduled local communication window.

3. The method of claim 2, wherein the network device's own periodic local communication windows and the global communication windows have frequencies defined by equations.

4. The method of claim 3, wherein the equation defining frequency of the global communication windows is $\Delta*2^m$, where $\Delta$ is a first integer equal to a minimum period between global communication windows and m is a second integer.

5. The method of claim 3, wherein the equation defining frequency of the network device's own local communication windows is $\Delta*2^n$, where $\Delta$ is a first integer equal to a minimum period between local communication windows and n is a second integer.

6. The method of claim 5, wherein n is determined, at least in part, based on message traffic.

7. The method of claim 5, wherein n is determined, at least in part, based on power consumption needs.

8. The method of claim 5, wherein n is determined, at least in part, based on a devices available battery life.

9. The method of claim 3, wherein the equation defining the frequency of the global communication windows is $\Delta*2^m$ and the equation defining the local communication windows is $\Delta*2^n$, where $\Delta$ is a first integer equal to a minimum period between global communication windows to a minimum period between local communication windows, m is a second integer and n is a third integer, and where n is less than m.

10. The method of claim 9, wherein n is equal to the largest value of n for the neighborhood.

11. The method of claim 2 further comprising selecting an Active Cycle Start Time that is advertised for a particular beaconing group.

12. The method of claim 11, further comprising a device selecting an Active Cycle Start Time if no beacon is received.

13. A network device having a neighborhood of neighbor devices comprising a computer readable medium having computer executable program code embodied thereon, the computer executable program code configured to cause the network device to perform a method for network communications on an autonomous peer network, the method comprising:
   the network device broadcasting a first schedule for its own periodic local communication windows to the neighborhood;
   the network device receiving schedules for neighbor devices' periodic local communication windows from neighbor devices of the neighborhood;
   the network device examining the received schedules for neighbor devices' periodic local communication windows and the first schedule of its own periodic local communication windows and determining a schedule for global communication windows corresponding to a schedule of local communication windows having a lowest frequency of occurrence of the examined schedules; and
   during a scheduled global communication window, the network device broadcasting a second schedule of periodic local communication windows to the neighborhood.

14. The device of claim 13, wherein the computer executable program code is further configured to perform the steps of:
   the network device waking from a hibernation state at a predetermined time for a scheduled local communication window;
   the network device receiving a transmission from another device in the set of neighbor network devices during the scheduled local communication window; and
   the network device returning to the hibernation state after the scheduled local communication window.

15. The device of claim 14, wherein the network device's own periodic local communication windows and the global communication windows have frequencies defined by equations.

16. The network device of claim 15, wherein the equation defining the frequency of the global communication windows is $\Delta*2^m$, where $\Delta$ is a first integer equal to a minimum period between global communication windows m is a second integer.

17. The network device of claim 15, wherein the equation defining the frequency of the local communication windows is $\Delta*2^n$, where $\Delta$ is a first integer equal to a minimum period between local communication windows and n is a second integer.

18. The network device of claim 17, wherein n is determined, at least in part, based on message traffic.

19. The network device of claim 17, wherein n is determined, at least in part, based on power consumption needs.

20. The network device of claim 17, wherein n is determined, at least in part, based on a devices available battery life.

21. The network device of claim 15, wherein the equation defining the frequency of the global communication windows is $\Delta*2^m$ and the equation defining the frequencies of the local communication windows is $\Delta*2^n$, where $\Delta$ is a first integer equal to a minimum period between global communication windows to a minimum period between local communication windows, m is a second integer and n is a third integer, and where n is less than m.

22. The network device of claim 21, wherein n is equal to the largest value of n for the neighborhood.

23. The network device of claim 13, wherein the computer executable program code is further configured to cause the network device to perform the step of selecting an Active Cycle Start Time that is advertised for a particular beaconing group.

24. The network device of claim 23, wherein the computer executable program code is further configured to cause the network device to perform the step of selecting an Active Cycle Start Time if no beacon is received.

* * * * *

UNITED STATES PATENT AND TRADEMARK OFFICE
CERTIFICATE OF CORRECTION

| | |
|---|---|
| PATENT NO. | : 7,751,357 B2 |
| APPLICATION NO. | : 11/671955 |
| DATED | : July 6, 2010 |
| INVENTOR(S) | : Alaa Muqattash et al. |

It is certified that error appears in the above-identified patent and that said Letters Patent is hereby corrected as shown below:

Col. 28 lines 66 through Col. 29 line 3

Claim 16 should read as follows:

The network device of claim 15, wherein the equation defining the frequency of the global communication windows is $\Delta * 2^m$, where $\Delta$ is a first integer equal to a minimum period between global communication windows and m is a second integer.

Signed and Sealed this

Twelfth Day of October, 2010

David J. Kappos
*Director of the United States Patent and Trademark Office*